(12) United States Patent
Ichikawa

(10) Patent No.: US 9,055,219 B2
(45) Date of Patent: Jun. 9, 2015

(54) IMAGE EDITING DEVICE AND IMAGE EDITING METHOD

(71) Applicant: OLYMPUS IMAGING CORP., Shibuya-ku, Tokyo (JP)

(72) Inventor: Manabu Ichikawa, Hachioji (JP)

(73) Assignee: OLYMPUS IMAGING CORP. (JP)

( * ) Notice: Subject to any disclaimer, the term of this patent is extended or adjusted under 35 U.S.C. 154(b) by 110 days.

(21) Appl. No.: 14/032,854

(22) Filed: Sep. 20, 2013

(65) Prior Publication Data

US 2014/0085509 A1    Mar. 27, 2014

(30) Foreign Application Priority Data

Sep. 26, 2012 (JP) ................................ 2012-213259

(51) Int. Cl.

| | |
|---|---|
| *G06K 9/40* | (2006.01) |
| *H04N 5/232* | (2006.01) |
| *H04N 9/74* | (2006.01) |
| *G06T 5/00* | (2006.01) |
| *G06T 5/40* | (2006.01) |
| *H04N 1/41* | (2006.01) |
| *G06T 11/60* | (2006.01) |
| *H04N 1/387* | (2006.01) |
| *H04N 101/00* | (2006.01) |

(52) U.S. Cl.
CPC ....... *H04N 5/23229* (2013.01); *H04N 5/23216* (2013.01); *H04N 5/23245* (2013.01); *H04N 5/23293* (2013.01); *H04N 9/74* (2013.01); *G06T 5/009* (2013.01); *G06T 5/40* (2013.01); *H04N 1/41* (2013.01); *H04N 2101/00* (2013.01); *G06T 11/60* (2013.01); *H04N 1/3871* (2013.01)

(58) Field of Classification Search
CPC .......... H04N 5/23216; H04N 5/23229; H04N 5/23245; H04N 5/23293; G06K 9/00; G06K 9/00456; G06K 9/00751; G06K 9/6202
USPC ........................................................ 382/264
See application file for complete search history.

(56) References Cited

U.S. PATENT DOCUMENTS

2009/0245666 A1* 10/2009 Yamashina ................. 382/235
2010/0079492 A1*  4/2010 Nakamura ................. 345/634
(Continued)

FOREIGN PATENT DOCUMENTS

| JP | 09-198494 | 7/1997 |
|---|---|---|
| JP | 09-212626 | 8/1997 |
| JP | 10-051654 | 2/1998 |

*Primary Examiner* — Stephen R Koziol
*Assistant Examiner* — Shaghayegh Azima
(74) *Attorney, Agent, or Firm* — Volpe and Koenig, P.C.

(57) ABSTRACT

An image editing device, for editing a combined photographic image formed by combining a plurality of images with a predetermined background image, comprises a combined photograph processing section for creating a combined photograph by combining a plurality of images with the background image in accordance with combining position of the combined photograph, an image compression section for dividing the combined photograph into a number of blocks of a specified number of pixels, and subjecting an image to lossy compression, a background portion image selection section for dividing the background image into the blocks, and selecting a plurality of blocks that include at least the combining position as a background portion image, and a storage section for storing an image that has been compressed by the image compression section, and the background portion image that has been selected by the background portion image selection section, as a single image file.

7 Claims, 26 Drawing Sheets

(56) References Cited

U.S. PATENT DOCUMENTS

2012/0086830 A1* 4/2012 Ichikawa et al. ........... 348/223.1
2012/0120054 A1* 5/2012 Sandrew et al. ............. 345/419
2012/0299881 A1* 11/2012 De Muelenaere et al. .... 345/179
2013/0259363 A1* 10/2013 Ozawa et al. ................. 382/164
2013/0259366 A1* 10/2013 Tsugimura .................... 382/164
2014/0085511 A1* 3/2014 Toida et al. ................... 348/239

* cited by examiner

FIG. 3
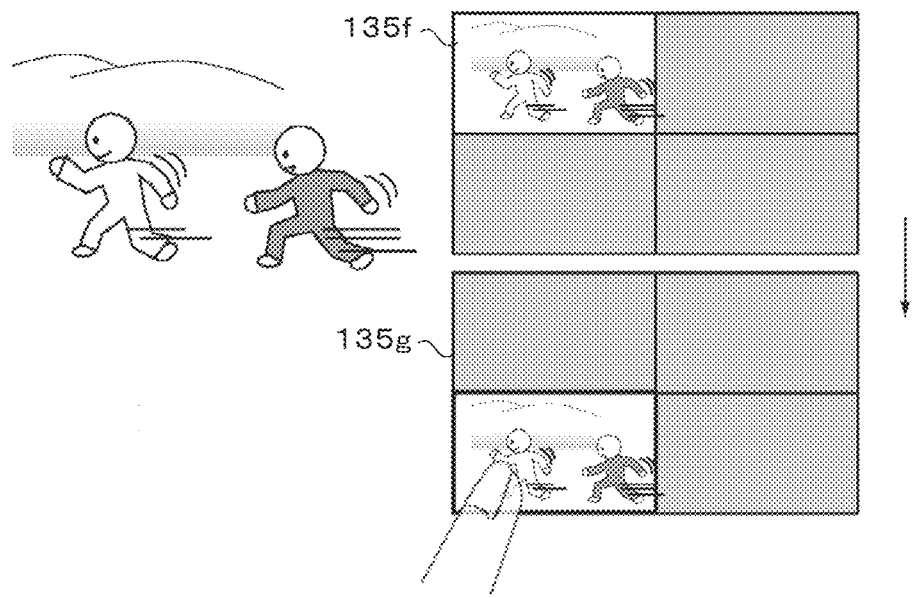
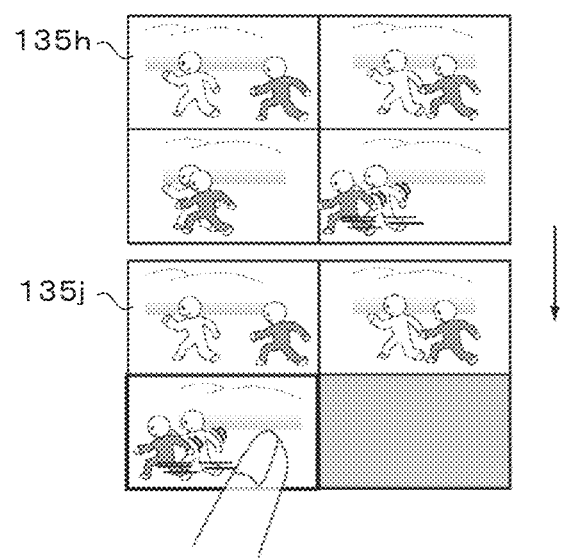

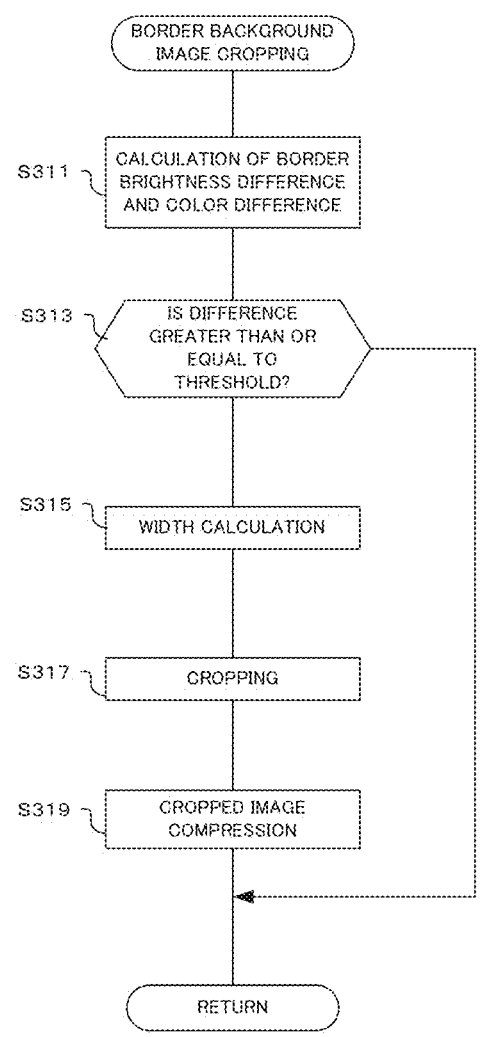

CONBINED PHOTOGRAPH TO BE EDITED EDITING SEQUENCE

EXAMPLE OF BRIGHTNESS
DIFFERENCE AND BACKGROUND SIZE

EXAMPLE OF DIFFERENCE IN COLOR
DIFFERENCE, AND BACKGROUND SIZE

ENLARGED VIEW OF COMBINED PHOTOGRAPH TO BE EDITED

COMBINED PHOTOGRAPH TO BE EDITED

EDITING SEQUENCE 1/2

EDITING SEQUENCE 2/2

ENLARGED VIEW OF COMBINED
PHOTOGRAPH TO BE EDITED

ENLARGED VIEW OF COMBINED
PHOTOGRAPH TO BE EDITED

ENLARGED VIEW OF COMBINED
PHOTOGRAPH TO BE EDITED

IMAGE EDITING DEVICE AND IMAGE EDITING METHOD

Benefit is claimed, under 35 U.S.C. §119, to the filing date of prior Japanese Patent Application No. 2012-213259 filed on Sep. 26, 2012. This application is expressly incorporated herein by reference. The scope of the present invention is not limited to any requirements of the specific embodiments described in the application.

BACKGROUND OF THE INVENTION

1. Field of the Invention

The present invention relates to an image editing device for editing an image such as a combined photograph made up of a plurality of photographs, and to an imaging editing method.

2. Description of the Related Art

A conventional image editing device that can acquire an image from which arbitrary objects have been removed by means of a simple operation is known (for example, Japanese patent laid-open No. Hei. 09-212626). Technology to vary density between first and second borders in correlation to distance between the first and second borders, to create a third image, is also known (for example, Japanese patent laid-open No. Hei. 09-198494). There is also known an image processing device for preventing unnatural images in which color discontinuities arise at portions close to borders where replacement is carried out or is not carried out (for example, Japanese patent laid-open No. Hei. 10-051654).

SUMMARY OF THE INVENTION

The present invention has as its object to provide an image editing device and an image editing method capable of replacement, in a combined photograph, with high quality and natural appearance.

An image editing device of the present invention, for editing a combined photographic image formed by combining a plurality of images on a predetermined background image, comprises a combined photograph processing section for creating a combined photograph by combining a plurality of images with the background image in accordance with combining position of the combined photograph, an image compression section for lossy compression by dividing the combined photograph into a number of blocks of a specified number of pixels, and subjecting an image to lossy compression, a background portion image selection section for dividing the background image into the blocks, and selecting a plurality of blocks that include at least the combining position as a background portion image, and a storage section for storing an image that has been compressed by the image compression section, and the background portion image that has been selected by the background portion image selection section, as a single image file.

An image editing method of the present invention, for editing a combined photographic image formed by combining a plurality of images on a predetermined background image, comprises the following steps: a step of creating a combined photograph by combining a plurality of images with the background image in accordance with combining position of the combined photograph; a step of dividing the combined photograph into a number of blocks of a specified number of pixels, and subjecting an image to lossy compression; a step of dividing the background image into the blocks, and selecting a plurality of blocks that include at least the combining position as a background portion image, and a step of storing the compressed image under the selected background portion image as a single image file.

BRIEF DESCRIPTION OF THE DRAWINGS

FIG. 3 is a drawing showing one example of image-editing, in a camera of one embodiment of present invention, and shows the appearance of carrying out image editing by touching a preview.

FIG. 21 is a flowchart showing operation of border background image cropping of the camera of one embodiment of the present invention.

DETAILED DESCRIPTION OF THE PREFERRED EMBODIMENTS

In the following, preferred embodiments using a camera adopting the present invention will be described using the drawings. A camera of one embodiment of the present invention is a digital camera, and has an imaging section, with a subject image being converted to image data by this imaging section, and the subject image then being subjected to live view display on a display section arranged on a rear surface of a main body based on this converted image data. A photographer determines composition and photo opportunity by looking at the live view display. At the time of a release operation image data is stored in a storage medium. Image data that has been stored in the storage medium can be played back and displayed on the display section if playback mode is selected.

The camera of this embodiment also functions as an image editing device for editing a combined photographic image formed by combining a plurality of images on a predetermined background image. Specifically, a display section is capable of dividing a screen into a plurality of screens, and carrying out playback display of a combined photograph formed from a plurality of images. A photograph of a part within this combined photograph may be replaced with a live view image, or an image that has already been taken and is stored in a storage medium. In this case, the vicinity of a border section between the background image and the combined images (replacement images) is filled by a temporary background image, images are combined after replacement. At this time, the background image, by compressing using a compression method and compression ratio that are the same as for the combined photograph at a position that matches the border of blocks at the time of image compression and in a size that matches the blocks, is stored together with the combined photograph.

Figure 1:
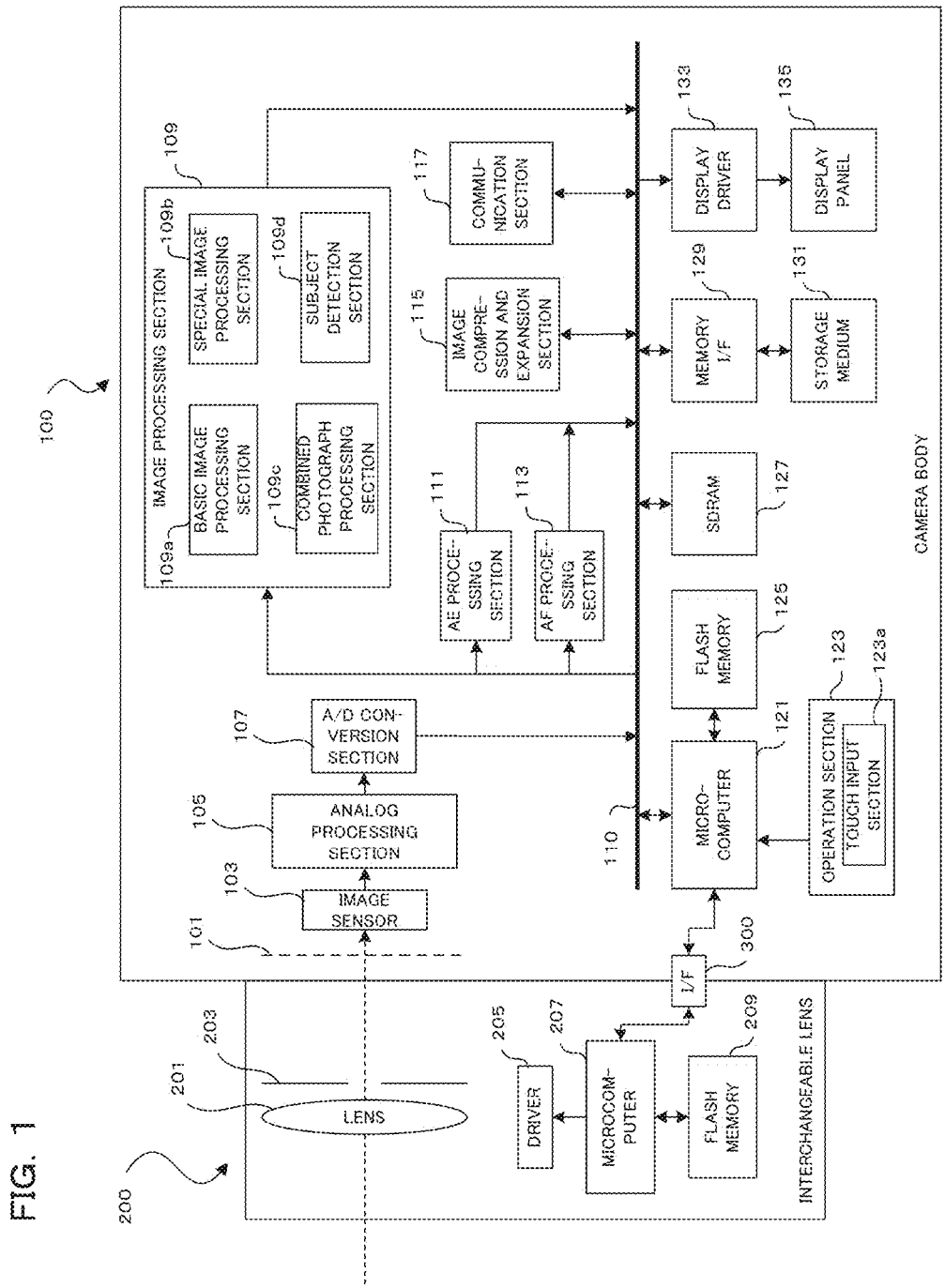
FIG. 1 is a block diagram mainly showing the electrical structure of a camera of one embodiment of the present invention.

FIG. 1 is a block diagram mainly showing the electrical structure of a camera of one embodiment of the present invention. This camera comprises a camera body 100 and an interchangeable lens 200 that can be attached to and removed from the camera body. With this embodiment, the photographing lens is an interchangeable lens, but this is not limiting, and it is also possible to have a digital camera of a type where a photographing lens is fixed to the camera body.

The interchangeable lens 200 is made up of a photographing lens 201, a diaphragm 203, a driver 205, a microcomputer 207 and a flash memory 209, and has an interface (hereafter referred to as I/F) 300 between the interchangeable lens 200 and the camera body 100, which will be described later.

The photographing lens 201 is constituted by a plurality of optical lenses for forming a subject image, and is a fixed focal length lens or a zoom lens. The diaphragm 203 is arranged to the rear on the optical axis of this photographing lens 201, and the diaphragm 203 has a variable aperture to control amount of subject light flux passing through the photographing lens 201. Also, the photographing lens 201 is capable of being moved in the optical axis direction by the driver 205, with focus position of the photographing lens 201 being controlled based on control signals from the microcomputer 207, and in the case where the photographing lens 201 is a zoom lens focal length is also controlled. The driver 205 also controls aperture of the diaphragm 203.

The microcomputer 207 that is connected to the driver 205 is connected to the I/F 300 and the flash memory 209. The microcomputer 207 operates in accordance with a program stored in the flash memory 209, to perform communication with a microcomputer 121 within the camera body 100, which will be described later, and performs control of the interchangeable lens 200 based on control signals from the microcomputer 121.

Besides the previously described program, various information such as optical characteristics of the interchangeable lens 200 and adjustment values are stored in the flash memory 209. The I/F 300 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201. This mechanical shutter 101 controls the time for which subject light flux passes, and a well-known focal plane shutter or the like is adopted. Behind this mechanical shutter 101, an image sensor 103 is arranged at a position where the subject image is formed by the photographing lens 201.

The image sensor 103 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel. The image sensor 103 is not limited to a Bayer array, and various types such as Foveon (Registered trademark), for example, can also be used.

The image sensor 103 is connected to an analog processing section 105, and this analog processing section 105 performs wave shaping on the photoelectric conversion signals (analog image signals) that have been read out from the image sensor 103 after reducing reset noise etc., and also carries out gain increase so as to achieve an appropriate brightness.

This analog processing section 105 is connected to an A/D conversion section 107, and this A/D conversion section 107 performs analog to digital conversion on the analog image signals, and outputs the digital image signals (hereafter referred to as image data) to a bus 110. In this application, raw image data generated before image processing in the image processing section 109 is called RAW data.

The bus 110 is a transfer path for transferring various data, that has been read out or generated inside the camera body 100, within the camera body 100. Besides the previously described A/D conversion section 107, an image processing section 109, AE (AutoExposure) processing section 111, AF (AutoFocus) processing section 113, image compression and expansion section 115, communication section 117, the microcomputer 121, an SDRAM (synchronous DRAM) 127, memory interface (hereafter referred to as memory I/F) 129, and display driver 133 are connected to the bus 110.

The image processing section 109 is made up of a basic image processing section 109a for carrying out basic image processing, a special image processing section 109b for applying special effects in the case where art filter has been set, a combined photograph processing section 109c for carrying out editing processing for a combined image formed by combining a plurality of photographs into a singe image, and a subject detection section 109d for analyzing an image.

The basic image processing section 109a performs optical black (OB) subtraction processing, white balance (WB) correction, demosaicing processing in the case of Bayer data, gamma/color reproduction processing, color matrix computation, noise reduction (NR) processing, edge enhancement processing etc. on RAW data. In a single exposure, and if art filter has not been set, image processing is completed with only processing by this basic image processing section 109a.

Also, the special image processing section 109b applies various special effects to an image that has been processed by the basic image processing section, such as a pin hole effect to lower peripheral brightness, a soft focus effect to combine an original image with an image that has been blurred, a noise effect to combine with a noise image, a cross filter effect to draw cross patterns on bright points, a miniature effect to blur peripheral portions etc., in accordance with a special effect (art filter) that has been set.

The combined photograph processing section 109c forms a single image (combined photograph) by combining a plurality of images. In combining images, a template (refer to FIG. 5 which will be described later) is read out from flash memory 125, and brightness change is carried out using gamma correction within the basic image processing section 109a so that brightness of the images becomes the same. Also, WB is changed using color reproduction processing within the basic image processing section 109a, in order to unify the overall white balance (WB). Also, a special effect such as a pinhole effect is applied after combination using the special image processing section 109b, and correction etc. of an incorporation image and a replacement image is carried out.

The combined photograph processing section 109c functions as a combined photograph processing section for creating a combined photograph by combining a plurality of images with the background image in accordance with combining position of the combined photograph. It also functions as a background portion combining section for combining a background portion image stored in an image file with an image that has been expanded by the image expansion section (implemented by the image compression and expansion section 115), and combines the replacement image with the image that was combined by the background portion combining section.

The subject detection section 109d detects a subject such as a person's face or a pet, by analysis of an image using pattern matching etc. In the event that it is possible to detect a subject, information such as the type, size, position and reliability etc. of the subject within an image is acquired.

The AE processing section 111 measures subject brightness based on image data that has been input via the bus 110, and outputs this subject brightness information to the microcomputer 121 via the bus 110. A dedicated photometric sensor for subject brightness measurement may be provided, but in this embodiment subject brightness is calculated based on image data.

The AF processing section 113 extracts signals for high frequency components from image data, acquires a focus evaluation value using integration processing, and outputs the focus evaluation value via the bus 110 to the microcomputer 121. In this embodiment, focusing of the photographing lens 201 is carried out using the so-called contrast method. With this embodiment AF control using a contrast method is given as an example, but it is also possible to carry out focusing by AF control using phase difference AF, where a phase difference sensor is provided on the optical path, or a phase difference sensor is provided on an image sensor.

At the time of storage of image data to the storage medium 131, the image compression and expansion section 115 subjects image data that has been read out from the SDRAM 127 to compression in accordance with various compression formats such as JPEG compression in the case of a still picture or MPEG in the case of a movie. The microcomputer 121 attaches a header necessary for configuring a JPEG file or an MPO (Multi Picture Object) file or MPEG file to the JPEG image data or MPEG image data, to create a JPEG file or an MPO file or MPEG file, and stores the created file in the storage medium 131 via the memory I/F 129.

The image compression and expansion section 115 functions as an image compression section for dividing the combined photograph into a number of blocks of a specified number of pixels, and performing image compression. The image compression and expansion section 115 also functions as an image expansion section for expanding the image that was subjected to image compression and is stored in the image file. With this embodiment, an image file made up of an image of a combined photograph (main image) and individual images making up a combined photograph (subsidiary images) is stored. This file structure will be described later in FIG. 24A.

The image compression and expansion section 115 also carries out expansion of JPEG image data and MPEG image data for image playback display. In the expansion, a file that is stored in the storage medium 131 is read out, and after being subjected to expansion processing in the image compression and expansion section 115 the expanded image data is temporarily stored in the SDRAM 127. With this embodiment, the JPEG compression system and MPEG compression system are adopted as the image compression system, but the compression system is not limited to this and another compression systems may be used, such as TIFF, H.264 etc.

The communication section 117 performs communication with external sections by means of wire communication using USB or land etc., or wireless communication. Templates for division of combined photographs that are stored within the flash memory 125 are updated or added by means of the communication section 117.

The microcomputer 121 provides a function as a control section for this entire camera, and performs overall control of various sequences of the camera. The microcomputer 121 functions as a background portion image selection section for dividing the background image into blocks, and selecting a plurality of blocks that include at least combining position of the combined photograph as background portion images. Selection of this background portion will be described later using S305 in FIG. 20, and FIG. 21. The background portion image selection section also changes the number of blocks selected as the background portion image, in accordance with differences in luminance components of a border section of the plurality of images and the background image (refer to S313 and S315 in FIG. 21, and FIG. 23A-FIG. 23E). Besides the previously described I/F 300, an operation section 123 and a flash memory 125 are connected to the microcomputer 121.

The operation section 123 includes operation members such as various input buttons, like a power supply button, release button, a movie button, playback button, menu button, cross-shaped key, OK button, delete button, magnification button and various input keys, and detects operating states of these operation members and outputs the result of detection to the microcomputer 121. The microcomputer 121 executes various sequences according to user operation based on the result of detection of the operation members from the operation section 123. The power supply button is an operation member for instructing to turn a power supply of the digital camera on or off. If the power supply button is pressed, the power supply of the digital camera is turned on, and if the power supply button is pressed once again the power supply of the digital camera is turned off.

The release button is made up of a first release switch that turns on when the button is pressed down half way, and a second release switch that is turned on when the button is pressed down further from the half-pressed state to be pressed down fully. The microcomputer 121 executes shooting preparation sequences such as an AE operation and AF operation if the first release switch is turned on. Also, if the second release switch is turned on shooting is carried out by executing a series of shooting sequences to control the mechanical shutter 101 etc., acquire image data based on a subject image from the image sensor 103 etc., and store this image data in the storage medium 131.

The movie button is an operation button for designating start or finish of movie shooting, and if the movie button is initially operated movie shooting commences, and movie shooting finishes when it is operated again. The playback button is an operation button for setting and canceling playback mode settings, and if playback mode is set image data of a taken image is read out from the storage medium 131, and a taken image is playback displayed on the display panel 135. The delete button is an operation button for designating and deleting an image in cases such as where playback images are displayed as a list, or a combined photograph is being displayed, for example. The magnification button is an operation button for enlarging a display image at the time of playback display.

The menu button is an operation button for causing display of menu screens on the display panel 135. It is possible to carry out the various camera settings on the menu screens. As camera settings there are shooting mode settings such as normal shooting mode and combined photograph for example, and finish settings such as natural, vivid, flat, portrayed, art filter etc. As art filters there are pop art, toy photo, fantastic focus, rough monochrome, Diorama, Crystal etc. It is also possible to have various settings on the menu screens, such as style of a combined photograph, selection of the replacement image for a combined photograph, and whether or not an image before editing will be stored at the time of editing a combined photograph. In the case of a combined photograph, display of a live view (LV) image is updated in accordance with a filter and incorporation image selection state (refer to S47 in FIG. 7).

A touch input section 123a is also provided on the operation section 123. The display panel 135 is capable of touch operation, and the touch input section 123a detects a position that has been touched by a user etc. and outputs to the microcomputer 121.

The flash memory 125 stores a program for executing the various sequences of the microcomputer 121. The microcomputer 121 carries out overall control of the camera based on this program.

The SDRAM 127 is an electrically rewritable volatile memory for temporary storage of image data etc. This SDRAM 127 temporarily stores image data that has been output from the A/D conversion section 107, and image data that has been processed in the image processing section 109 and image compression and expansion section 115 etc.

The memory I/F 129 is connected to the storage medium 131, and carries out control for reading and writing of data, such as image data and headers attached to image data, to and from the storage medium 131. The storage medium 131 is a storage medium such as a memory card that can be loaded into and taken out of the camera body 100, but this is not limiting and it may also be a hard disk or the like built into the camera body 100. The above described SDRAM 127 or storage medium 131 functions as a storage section for storing an image that has been compressed by the image compression section, and the background portion image that has been selected by the background portion image selection section (implemented by the microcomputer 121 (refer to S30 in FIG. 20, and FIG. 21)), as a single image file.

The LCD driver 133 is connected to the display panel 135, and reads out from the SDRAM 127 and storage medium 131 to display an image on the display panel 135 based on image data that has been expanded by the image compression and expansion section 115. The display panel 135 is arranged on a rear surface of the camera body 100, and carries out image display. As image display modes, there are Quickview Display for displaying stored image data for only a short time, playback display of image files for still images and movies that have been stored in the storage medium 131, and movie display such as live view display. As a display section it is possible to adopt various display panels such as a liquid crystal display panel (LCD), or organic EL etc.

Figure 2:
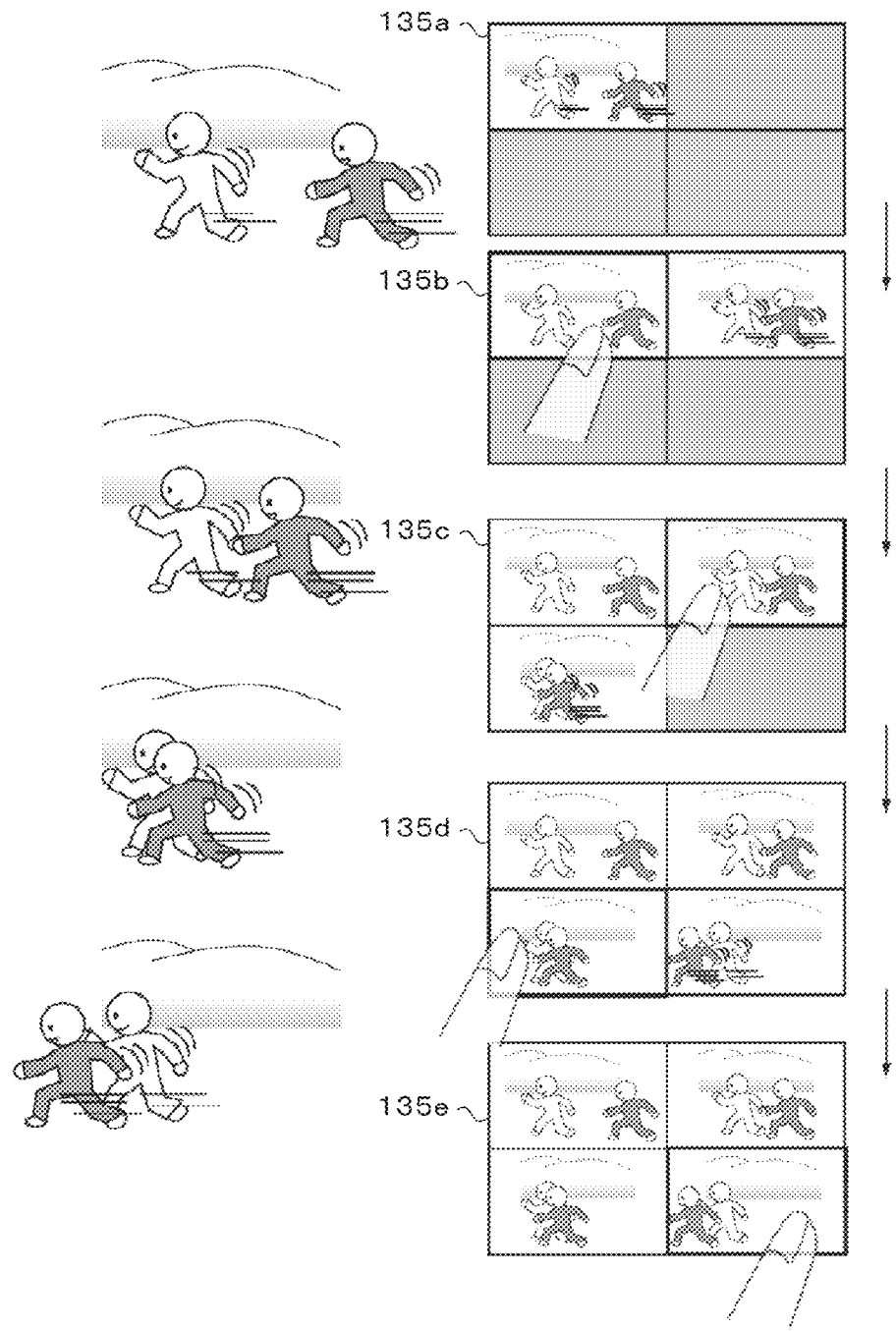
FIG. 2 is a drawing showing one example of image-editing, in a camera of one embodiment of present invention, and shows the appearance of carrying out image editing by touching a preview.

Next, editing operations for a combined photograph of the camera of this embodiment will be described using FIG. 2 to FIG. 5. FIG. 2 shows live view display for the case where combined photograph mode is selected, and a screen of the display panel 135 has been divided into 4. Diagonal lines within a divided screen (double lines close to the elbows of a person and double lines behind the legs) indicate that a subject is moving. The appearance of the subject is shown on the left side of FIG. 2, while the right side shows a display state of the display panel 135.

First, as shown in 135a of FIG. 2, within the 4 divided screens live view display is performed on the upper left screen. If the user touches the upper left of the display panel 135 when they wish to acquire this as an image for the combined photograph, then as shown in 135b shooting is decided and live view display is carried out on the next screen (upper right screen). Next, 135c is the appearance of deciding shooting for the upper right screen, while 135d shows the appearance of deciding shooting for the lower left screen. If shooting of the lower right screen is decided (refer to 135e), shooting is completed and a combined photograph is possible.

With the example shown in FIG. 2, shooting is decided by touching the display panel 135, and live view display is performed in order at the upper left→upper right→lower left→lower right. However, live view display does not have to be carried out in this order. For example, as shown in FIG. 3, it is also possible to carry out live view display such that when live view display is being performed on the upper left screen (refer to 135f in FIG. 3), if the lower left screen which is not performing live view display is touched, live view display is then performed on this screen (refer to 135g in FIG. 3). The actual operation of updating this shooting frame will be described later using steps S161 and S163 in FIG. 14.

Also, in FIG. 2 shooting is decided if the display panel 135 is touched during live view display, but even with a screen that has been decided, the live view display screen can be returned to if the display panel 135 is touched again. With the display panel 135h shown in FIG. 3, shooting has been decided on 3 screens (upper left, upper right, and lower left screens), but if the lower left screen for which shooting has been decided is touched, the lower left screen of the display panel 135j becomes a live view display screen.

Figure 4:
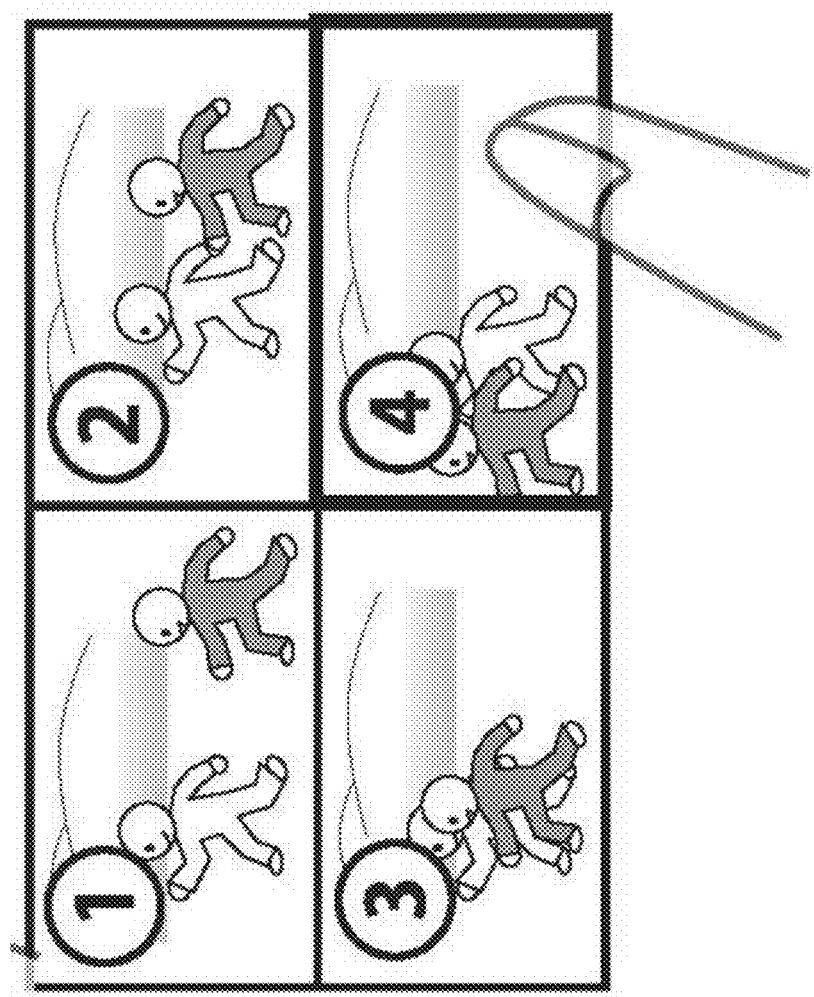
FIG. 4 is a drawing showing one example of image-editing, in a camera of one embodiment of present invention, and shows the appearance of deciding an editing frame.

Also, with this embodiment, even after shooting has been decided for all frames, and a combined photograph has been formed, it is possible to replace some of the images with another image. For example, FIG. 4 shows a situation where four images have been decided, but the user has specified to replace the image on the lower right screen with another image. With this embodiment, the frame of the image is displayed by touching, to indicate that it is an image to be recombined.

Figure 5:
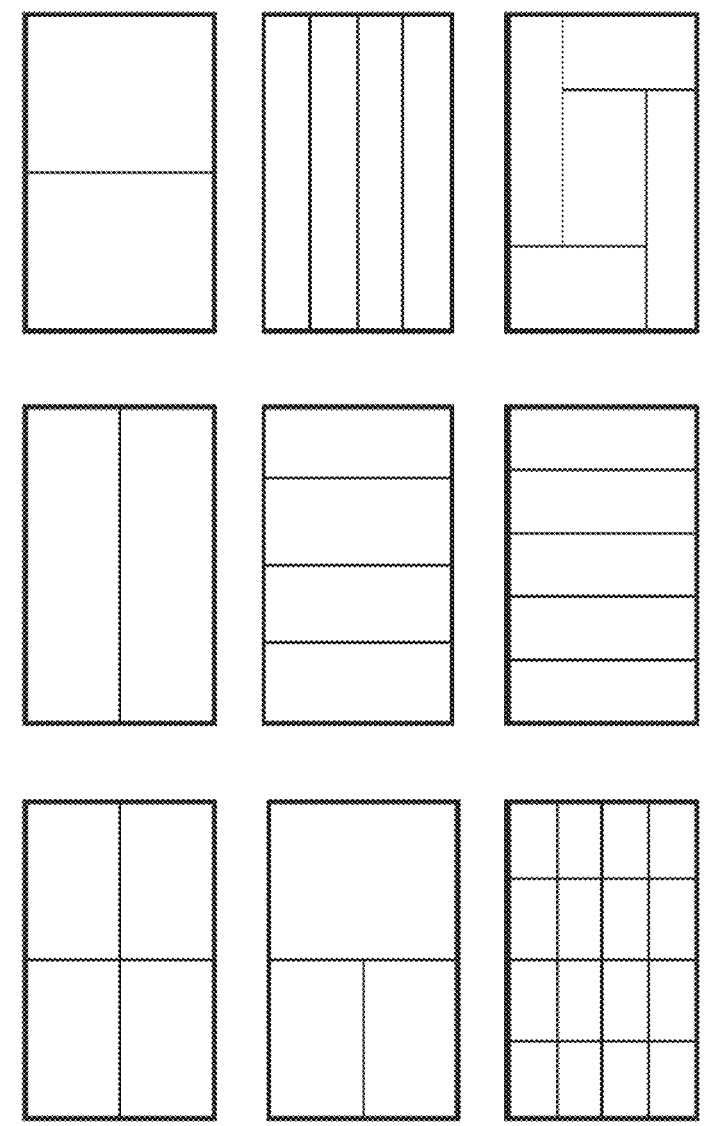
FIG. 5 is a drawing showing an example of screen division, with the camera of one embodiment of the present invention.

With examples of combined photographs shown in FIG. 2 to FIG. 4, they have been divided into 4, namely upper left, upper right, lower left, and lower right, but the division of the screen is not limited to this. For example, it is also possible to divide into various formats, as shown in FIG. 5. The format of this division (template, style) is stored in the flash memory 125, so that the user can set according to taste.

Next, main processing of the camera of this embodiment will be described using the flowcharts shown in FIG. 6 and FIG. 7. The flowcharts shown in FIG. 6-FIG. 11, FIG. 13-FIG. 15, and FIG. 17-FIG. 21 are executed by the microcomputer 121 controlling each section in accordance with programs stored in the flash memory 125.

Figure 6:
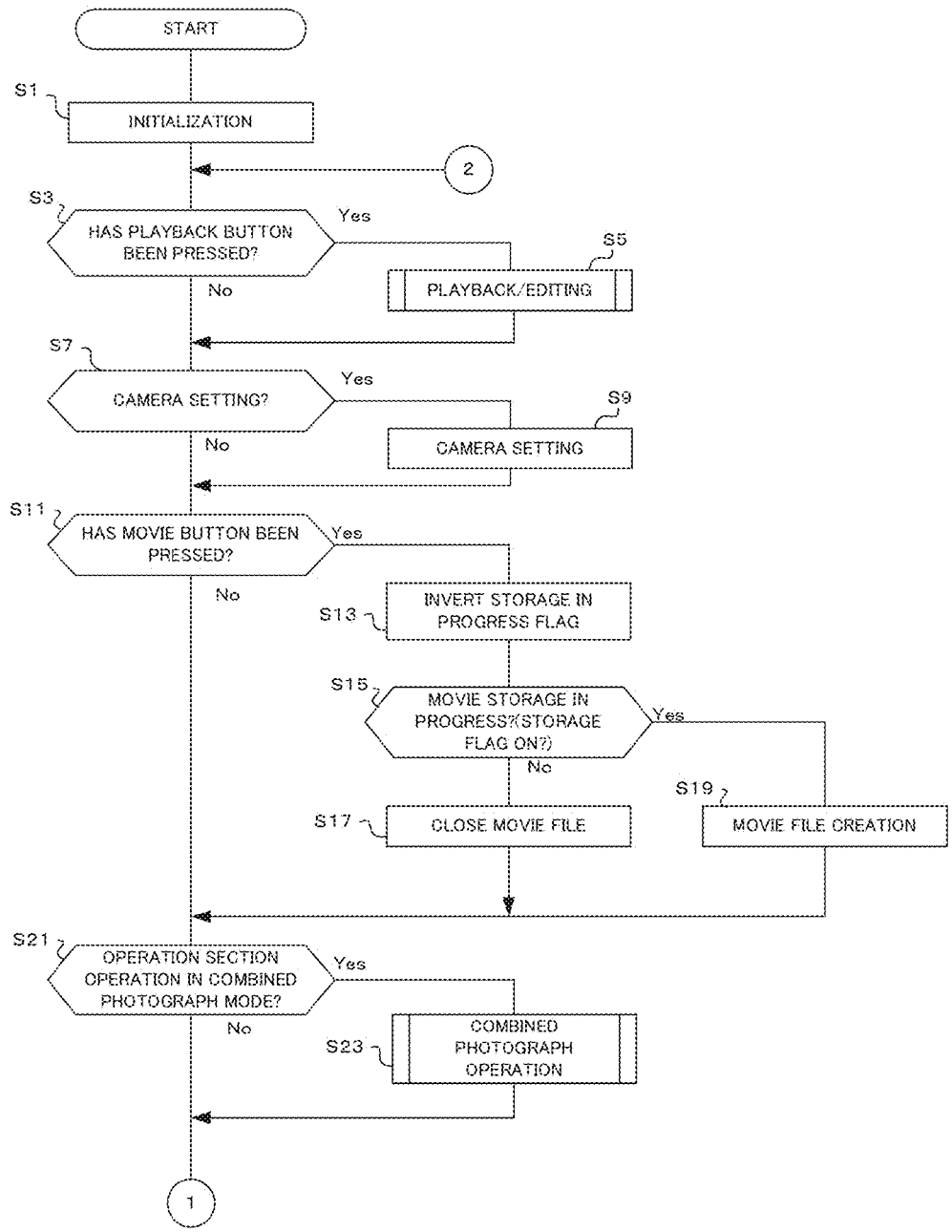
FIG. 6 is a flowchart showing main operation of the camera of one embodiment of the present invention.
Figure 7:
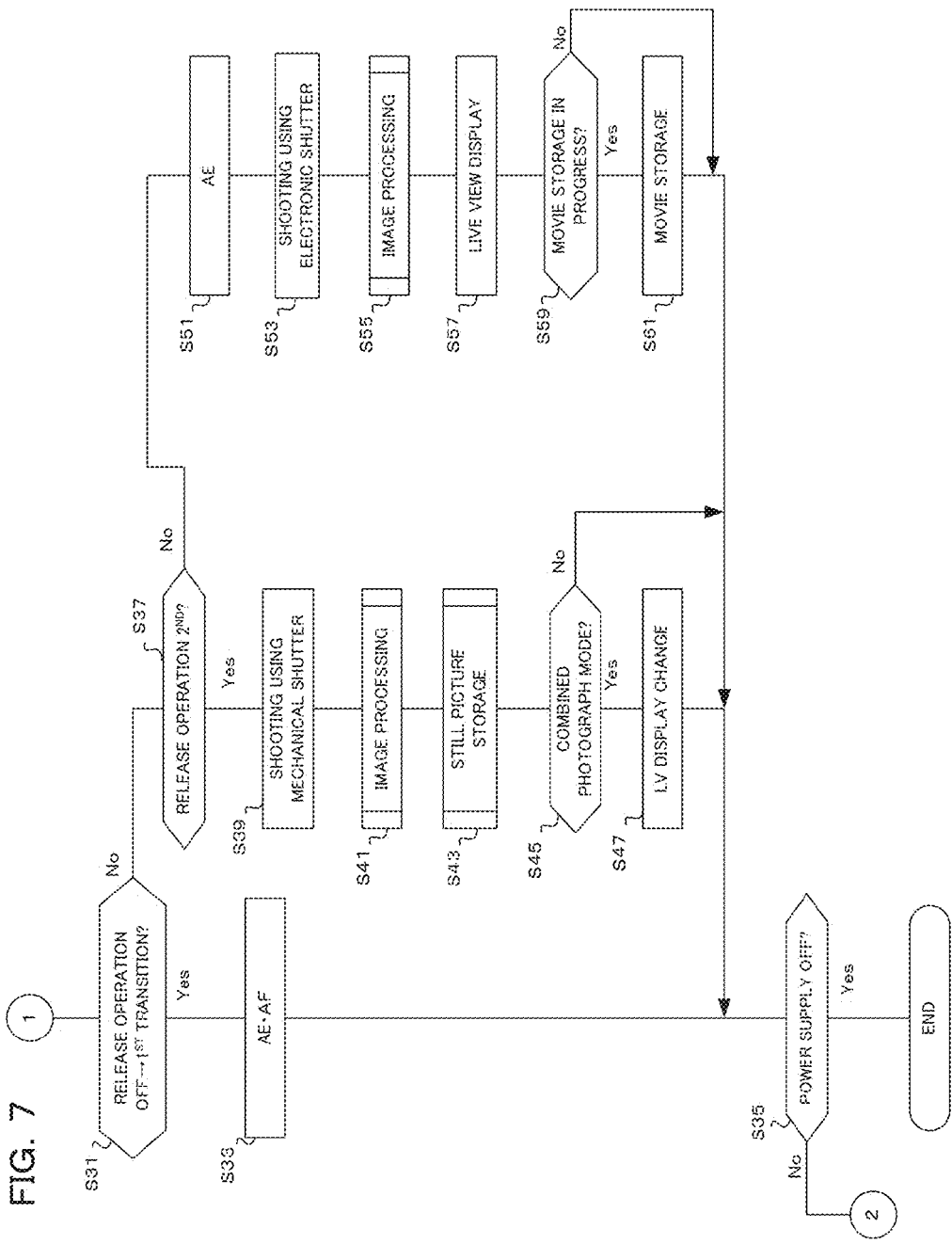
FIG. 7 is a flowchart showing main operation of the camera of one embodiment of the present invention.

If the power supply button within the operation section 123 is operated and the power supply is turned on, operation of the main flow shown in FIG. 6 is started. Once operation has commenced, initialization is first executed (Si). As part of the initialization, mechanical initialization and electrical initialization, such as initialization of various flags etc., are carried out. As one of the various flags, a storage in progress flag indicating whether or not movie storage is in progress is reset to off (refer to Steps S13 and S15).

Once initialization has been carried out, it is next determined whether or not the playback button has been pressed (S3). Here, determination is carried out by detecting the operating state of the playback button within the operation section 123. If the result of this determination is that the playback button has been pressed, playback/editing mode is executed (S5). Here, image data is read out from the storage medium 131, and a table of still images and movies is displayed on the LCD 135. The user selects an image from within the table by operating the cross-shaped key and decides on the image using the OK button. Editing of a combined photograph is also carried out in this step. Detailed operation of this playback/editing will be described later using FIG. 17.

If playback/editing is executed in step S5, or if the result of determination in step S3 was that the playback button had not been pressed, it is determined whether or not camera setting will be carried out (S7). When the menu button within the operation section 123 has been operated, camera setting is carried out on a menu screen. In this step therefore, determination is based on whether or not this camera setting has been carried out.

If the result of determination in step S7 is camera setting, camera setting is carried out (S9). As described previously, it is possible to carry out various camera settings on the menu screens. As camera settings there are, as described previously, shooting mode settings such as normal shooting mode and combined photograph, for example, and finish settings such as natural, vivid, flat, portrait, art filter etc. As art filters there are pop art, toy photo, fantastic focus, rough monochrome, Diorama, Crystal etc. Various settings are also possible such as style of a combined photograph, selection of a replacement image for a combined photograph, whether or not an image before editing will be stored at the time of combined photograph editing, selection of an image for embedding an already stored image in a specified frame of a combined photograph, etc.

If camera setting has been carried out in step S9, or if the result of determination in step S7 was not camera setting, it is next determined whether or not the movie button has been pressed (S11). Here the microcomputer 121 carries out determination based on operating state of the movie button input from the operation section 123.

If the result of determination in step S11 is that the movie button has been pressed, the storage in progress flag is determined (S13). The storage in progress flag is set to on (1) if movie storage is progress, or set to off (0) if a movie is not being shot. In this step the flag is inverted, that is, if it is set to on (1) it is inverted to off (0), and if it is set to off (0) it is inverted to on (1).

Once inversion of the storage in progress flag has been carried out in step S13, it is next determined whether or not storage of a movie is in progress (S15). Here, determination is based on whether the storage in progress flag, which was inverted in step S13, is set to on or set to off.

If the result of determination in step S15 is that movie storage is in progress, a movie file is created (S19). Movie storage is carried out in step S61, which will be described later, but in this step a movie file for movie storage is created, and preparation so as to be able to store image data of the movie is performed.

On the other hand, if the result of determination is that move storage is not in progress, the movie file is closed (S17). The movie file is closed in this step because the movie button has been pressed and movie shooting is completed. When closing the movie file, the movie file is placed in a state of being capable of being played back by storing a number of frames in a header of the movie file etc., and file writing is completed.

Once the movie file has been closed in step S17, or if a movie file is created in step S19, or if the result of determination in step S11 was that the movie button was not pressed, it is next determined whether or not the operation section has been operated in combined photograph mode (S21). As described previously, setting of combined photograph mode is possible in the camera settings of step S9. In this step it is determined whether or not an operating section of the operation section 123 was operated in a state where this combined photograph mode is set.

If the result of determination in step S21 is that an operating section has been operated in combined photograph mode, a combined photograph operation is executed (S23). With this combined photograph operation, various operations for carrying out editing of the combined photograph, for example, shooting frame update, cancel operation, restoration operation, temporary save operation, temporary save and write operation, etc. are carried out. Detailed operation of this combined photograph operation will be described later using FIG. 14 and FIG. 15.

If playback/editing has been executed in step S23, or if the result of determination in step S21 was that an operating section was not operated in combined photograph mode, it is determined whether or not the release button has been pressed down halfway, in other words, whether or not the first release switch and gone from off to on (S31). For this determination, the state of the first release switch that is linked to the release button is detected by the operation section 123, and determination is carried out based on the result of detection. If the result of detection is that the first release switch has changed from off to on, the result of determination becomes Yes, while on the other hand if an on state or an off state is maintained the result of determination becomes No.

If the result of determination in step S31 is that the release button has been pressed down half way, then in the case where the first release has transitioned from off an AE/AF operation is executed (S33). Here, the AE processing section 111 detects subject brightness based on image data acquired by the image sensor 103, and calculates shutter speed and aperture value etc. for correct exposure based on this subject brightness.

Also, an AF operation is carried out in step S33. Here, the driver 205 moves focus position of the photographing lens 201 by means of the microcomputer 207 inside the interchangeable lens 200, so that a focus evaluation value that has been acquired by the AF processing section 113 becomes a peak value. As a result, if the release button is pressed down halfway when movie shooting is not being carried out, focusing of the photographing lens 201 is carried out at that point in time. After that processing advances to step S35.

If the result of determination in step S31 is that the release button has not transitioned from off to the first release, it is next determined whether or not the release button has been pressed down fully, and the second release switch has been turned on (S37). In this step, the state of the second release switch that is linked to the release button is detected by the operation section 123, and determination is carried out based on the result of detection.

If the result of determination in step S37 is that the release button is pressed down fully and that the second release which has been turned on, still image shooting is carried out using the mechanical shutter 101 (S39). Here, the diaphragm 203 is controlled with the aperture value that was calculated in step S33, and the shutter speed of the mechanical shutter 101 is controlled with the calculated shutter speed. Then, once the exposure time corresponding to the shutter speed has elapsed, image signals are read from the image sensor 103, and RAW data that has been processed by the analog processing section 105 and the A/D conversion section 107 is output to the bus 110.

Once shooting using the mechanical shutter 101 has been carried out, image processing is carried out (S41). Here, RAW data that has been acquired by the image sensor 103 as a result of shooting using the mechanical shutter 101 is read out, and image processing is carried out by the image processing section 109. Detailed operation of this image processing will be described later using FIG. 8.

Once image processing has been carried out, still picture storage is next carried out (S43). Here, image data for a still picture to which image processing has been applied is stored in the storage medium 131. In the case of having shot with a combined photograph, then in the event that it is desired to cancel (delete) part of an image within the combined photograph, it is possible to delete using a cancel operation. Detailed operation of this still picture storage will be described later using FIG. 13.

Once still picture storage has been carried out, it is next determined whether or not combined photograph mode has been set (S45). As described previously, combined photograph mode is set on a menu screen etc., and in this step whether or not this combined photograph mode has been set is determined.

If the result of determination in step S45 is that combined photograph mode has been set, update to live view (LV) display is carried out (S47). If combined photograph mode has been set, live view display is updated in accordance with a style (template, refer to FIG. 5) and a number of images. In a case where live view display is carried out all the time for all frames, live view display is carried out at parts other than where there are already taken images. Also, in the case of live view display one frame at a time (refer to the display method of FIG. 2), live view display is switched from a taken frame to the next frame (for example, in display panels 135a-135e of FIG. 2, in the order upper left→upper right→lower left→lower right). In either case, taken frames display taken images. It is also possible to display so as to know which are already taken images and which is live view display, using OSD (on-screen display), and it is also possible for already taken images to be displayed so as to know the order in which they were taken. After that processing advances to step S35.

If the result of determination in step S37 was not release operation 2nd, that is in the case where the second release switch is not on, AE is next carried out (S51). In the case S27 is passed through from previously described step S21, it is a situation where no operation was carried out for the release button, and in this case live view display of step S57, which will described later, is carried out. In step S51, exposure control is carried out in order to carry out live view display. Specifically, shutter speed and ISO sensitivity for the electronic shutter of the image sensor 103 in order to carry out live view display at the correct exposure are calculated.

Once AE has been carried out, shooting using the electronic shutter is carried out (S53). Here image data is acquired using the electronic shutter of the image sensor 103. Next, image processing is carried out on the acquired image data (S55). The image processing here is for live view display, and in the case where a special effect has been set, image processing in accordance with the set special effect is also carried out. Detailed operation of this image processing will be described later using FIG. 8.

If image processing has been carried out, live view display on the display panel 135 is carried out (S57). Image data is acquired in step S53, and image processing is carried out in step S55, and so in this step update of the live view display is carried out. A photographer can determine composition and photo opportunity by looking at the live view display.

Once live view display has been carried out in step S57, it is determined whether or not movie storage is in progress (S59). Here it is determined whether or not the storage in progress flag is on. If the result of this determination is that movie storage is in progress, movie storage is carried out (S61). Here, image data read out from the image sensor 103 is subjected to image processing to give image data for a movie, and stored in a movie file. After that processing advances to step S35.

In step S35 it is determined whether or not to power off. In this step it is determined whether or not the power supply button of the operation section 123 has been pressed again. If the result of this determination is not power off, processing returns to step S3. On the other hand, if the result of determination is power off, a termination operation of the main flow is executed and then the main flow is terminated.

In this way, with the main flow of the one embodiment of the present invention, in the case where combined photograph mode is set playback/editing is possible (S23), shooting is carried out if the release button is pressed down fully (release operation second), and update of live view display is performed.

Figure 8:
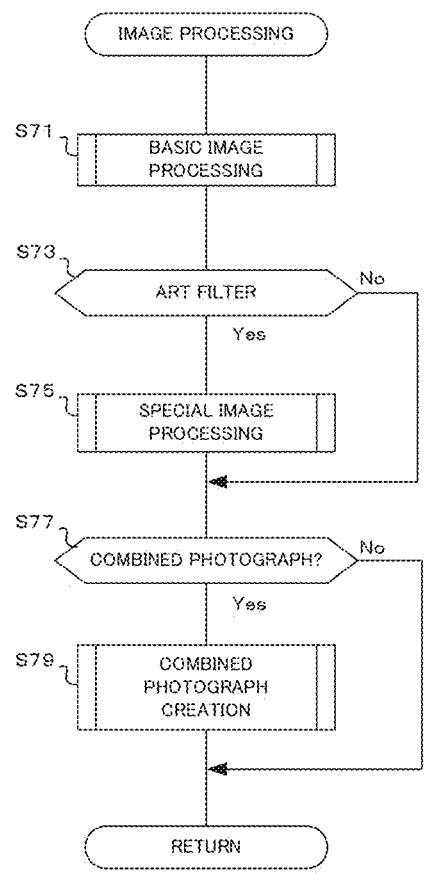
FIG. 8 is a flowchart showing operation of image processing of the camera of one embodiment of the present invention.

Next, the image processing of steps S41 and S55 will be described using the flowchart shown in FIG. 8. If the image processing flow is entered, basic image processing is first carried out (S71). Here, the basic image processing section 109a applies optical black (OB) subtraction, white balance (WB) correction, demosaicing processing, color reproduction processing, brightness change processing, edge enhancement processing, noise removal (NR) processing etc. to image data that has been read out from the image sensor 103 and subjected to AD conversion by the A/D conversion section 107. Detailed operation of this basic image processing will be described later using FIG. 9.

If basic image processing has been carried out, it is next determined whether or not art filter has been set (S73). An art filter is set in the previously described camera setting (S9), and so in this step it is determined whether or not an art filter has been set.

If the result of determination in step S73 is that an art filter has been set, special image processing is carried out (S75). Here, special image processing is applied in accordance with the type of art filter that has been set. Detailed operation of this special image processing will be described later using FIG. 10.

If special image processing has been carried out, or if the result of determination in step S73 is that an art filter has not been set, it is next determined whether or not it is a combined photograph (S77). If the result of this determination is that combined photograph mode has been set, combined photograph creation is carried out (S79). With this combined photograph creation, preprocessing such as resizing and rotation is carried out, and after carrying out color change and brightness change image combination is carried out in accordance with a style (template), to create a combined photograph. Detailed operation of this combined photograph creation will be described later using FIG. 11.

If combined photograph creation is carried out, or if the result of determination in step S77 is that combined photograph mode has been set, the originating processing flow is returned to.

In this way, with the image processing of this embodiment, after carrying out basic image processing and carrying out special image processing as required, combined photograph creation is carried out if combined photograph mode has been set.

Figure 9:
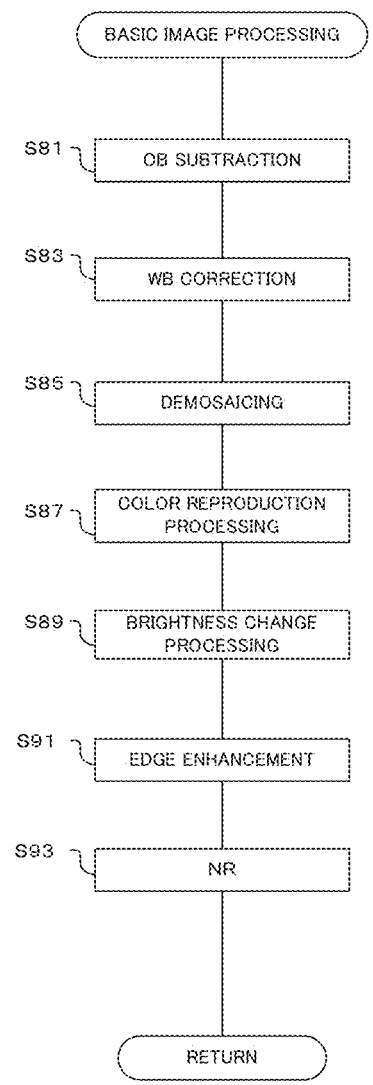
FIG. 9 is a flowchart showing operation of basic image processing of the camera of one embodiment of the present invention.

Next, detailed operation of the basic image processing in step S71 (FIG. 8) will be described using the flowchart shown in FIG. 9. If the basic image processing flow is entered, first optical black (OB) calculation is carried out (S81). In this step, an optical black value, which is ascribable to dark current etc. of the image sensor 103, is respectively subtracted from a pixel value of each pixel constituting the image data by an OB calculation section within the basic image processing section 109a.

Once OB calculation has been carried out, white balance (WB) correction is carried out (S83). In this step WB correction is carried out on image data by the WB correction section within the basic image processing section 109a, in accordance with a white balance mode that has been set in advance. Specifically, correction is carried out by reading out R gain and B gain corresponding to the white balance mode set by the user from the flash memory 125 of the camera body, and multiplying the image data of the Bayer array by these values. Alternatively, in the case of auto white balance, R gain and B gain are calculated from RAW data, and correction is carried out using these values.

Next, demosaicing processing is carried out (S85). In this step, image data that has been subjected to white balance correction is converted to data having each pixel made up of RGB data by a demosaicing processing section within the basic image processing section 109a. Specifically, data not at that pixel is obtained by interpolation from around that pixel position, and converted to RGB data. However, in the case where RAW data is already in the same format as RGB data (such as RAW data set that has been acquired from a Foveon sensor), demosaicing processing does not need to be carried out.

Once demosaicing processing has been carried out, color reproduction processing is carried out (S87). In this step, a linear transformation to multiply the image data by a color matrix coefficient according to the set white balance mode is carried out by a color reproduction processing section within the basic image processing section 109a, to correct the color of the image data. The color matrix coefficient is stored in the flash memory 125, and so it is read out and used.

Once color reproduction processing has been carried out, brightness change processing is carried out (S89). In this step a gamma table stored in the flash memory 125 is read out by a gamma processing section within the basic image processing section 109a, and gamma correction processing is carried out on the image data. After gamma conversion with RGB and color conversion to YCbCr, further gamma conversion is carried out with Y.

If gamma conversion has been carried out, edge enhancement is carried out next (S91). In this step, an edge enhancement processing section within the basic image processing section 109a enhances edges of the image data, by extracting edge components, for image data that has been subjected to gamma correction, using a band pass filter, multiplying by a coefficient corresponding to a degree of edge enhancement, and adding to the image data.

Next, NR (noise removal) is carried out (S93). In this step an image is subjected to frequency analysis, and processing is carried out to reduce noise in accordance with frequency. Once noise removal processing has been carried out, the originating processing flow is returned to.

Figure 10:
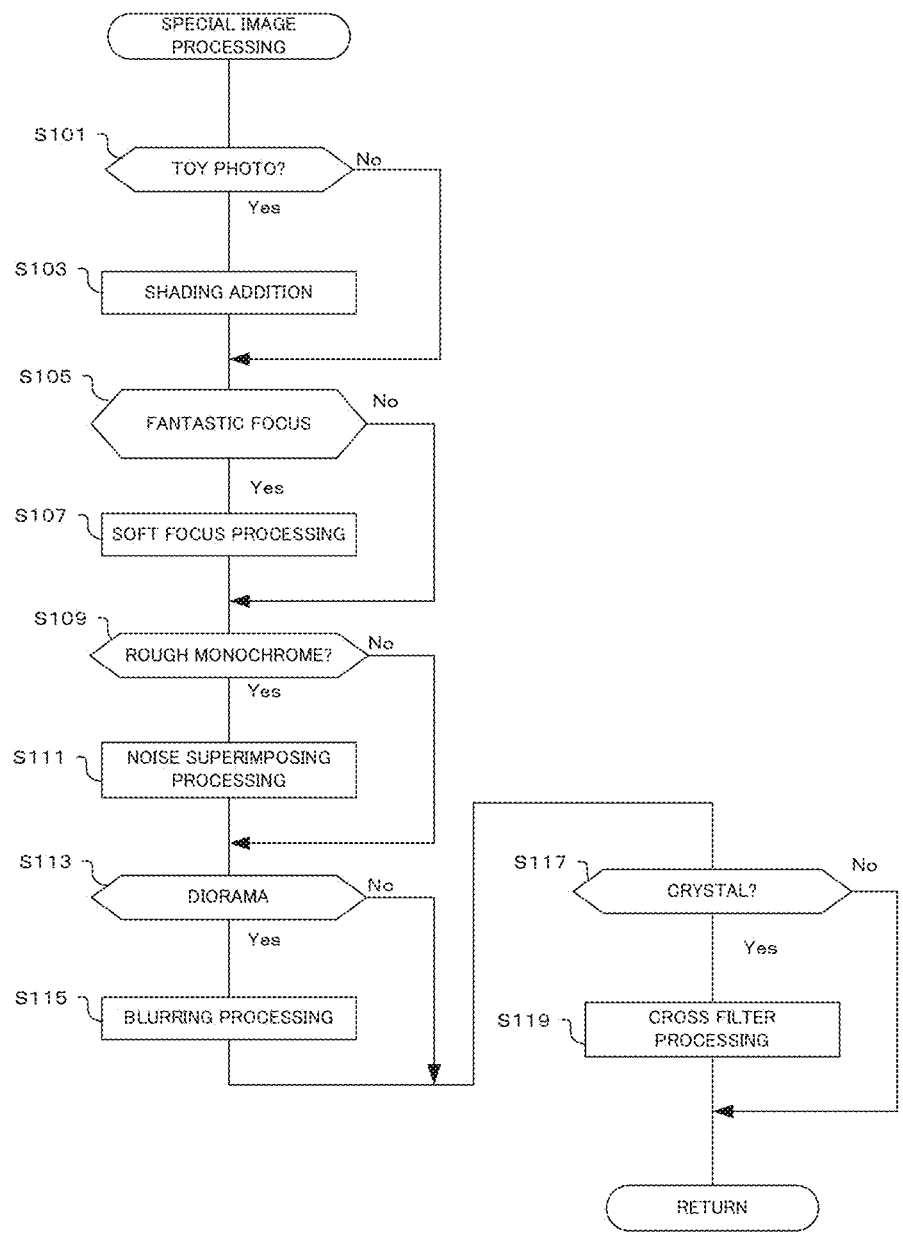
FIG. 10 is a flowchart showing operation of special image processing of the camera of one embodiment of the present invention.

Next, detailed operation of the special image processing in step S75 (FIG. 8) will be described using the flowchart shown in FIG. 10.

If the flow for special image processing is entered, it is first determined whether or not toy photo has been set as an art filter mode (S101). If the result of this determination is that toy photo has been set, a shading effect is added (S103). Here, the special image processing section 109b applies a shading effect to the periphery of the image by creating a gain map (gain values are one or less), such that brightness is gradually lowered in accordance with distance from the center of the image, and multiplying each pixel by a gain corresponding to the pixel.

If shading addition has been carried out, or if the result of determination in step S101 was not toy photo, it is determined whether or not fantastic focus has been set as the art filter mode (S105). If the result of this determination is that fantastic focus has been set, soft focus processing is carried out (S107). Here, the special image processing section 109b blurs an original image, and combines this blurred image and an image before blurring at a specified ratio (for example, a ratio of blurred image:image before blurring=2:3).

If soft focus processing has been carried out, or if the result of determination in step S105 was not fantastic focus, it is next determined whether or not rough monochrome has been set as the art filter mode (S109). If the result of this determination is that the rough monochrome has been set, noise superimposing processing is carried out (S111). Here, noise addition processing is applied to the image data by the special image processing section 109b. Noise addition processing is processing to add a previously created noise pattern image to the subject image. It is also possible to create a noise pattern image based on a random number etc.

If noise superimposing processing has been carried out, or if the result of determination in step S109 was not rough monochrome, it is next determined whether or not Diorama has been set as the art filter mode (S113). If the result of this determination is that Diorama has been set, blurring processing is carried out (S115). Here, the special image processing section 109b carries out gradual blurring processing of the original image above and below, or to the left and right, or in accordance with distance from, a center of an AF target.

If blurring processing has been carried out, or if the result of determination in step S113 was not Diorama, it is next determined whether or not Crystal has been set as the art filter mode (S117). If the result of this determination is that Crystal has been set, cross filter processing is carried out (S119). Here, the special image processing section 109b detects a bright point from within an image, and with this bright point as a center draws a cross shape or cross pattern, which is an effect for creating a shiny effect on a plurality of radial shapes.

If cross filter processing has been carried out, or if the result of determination in step S117 was that crystal was not set, the flow for special image processing is terminated, and the originating flow is returned to.

Figure 11:
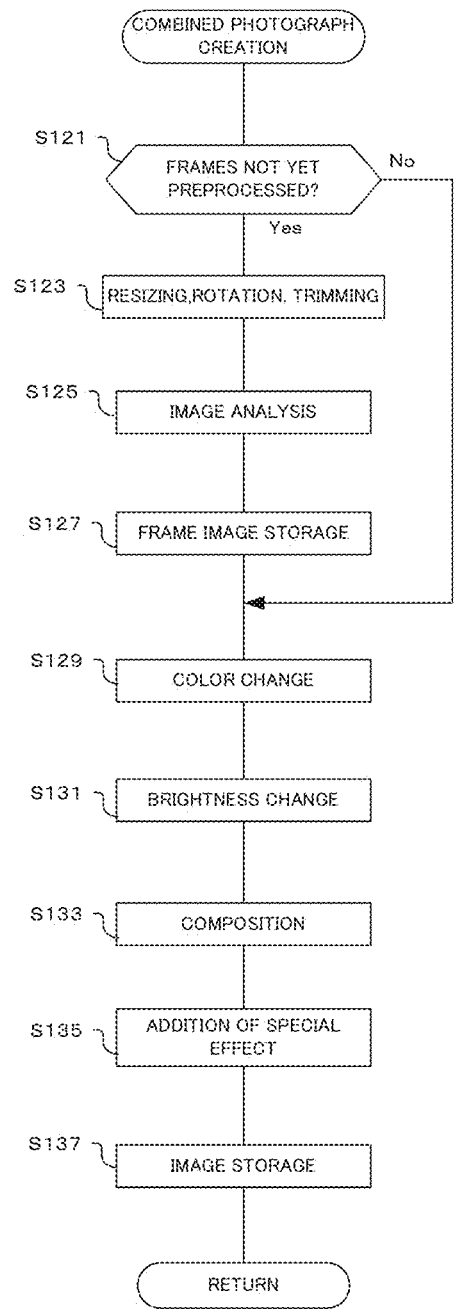
FIG. 11 is a flowchart showing operation of combined photograph formation of the camera of one embodiment of the present invention.

Next, detailed operation of the combined photograph creation in step S79 (FIG. 8) will be described using the flowchart shown in FIG. 11. As was described previously, with the flow for image processing shown in FIG. 8, first of all basic image processing is carried out, then special image processing is carried out, and next this combined photograph creation is carried out. With this combined photograph creation, images are combined in a style (template) such as is shown in FIG. 5. In carrying out this combination, roughly summarized, if there are frames that have not yet been subjected to the preprocessing outlined in steps S121-S127, preprocessing is applied. If the preprocessing has been applied, color change and brightness change etc. are carried out, image processing to embed images into the style is executed, and then image storage is carried out.

If the flow for combined photograph creation is entered, it is first determined whether or not there are frames to which preprocessing has not been applied (S121). Here, for images of all frames to be combined, it is determined whether or not preprocessing such as resizing, rotating, trimming, image analysis etc., for which it is not necessary to execute processing from step S128 and after each time, has been completed.

If the result of determination in step S121 was that there are frames that have not yet been subjected to preprocessing, resizing, rotation and trimming are carried out (S123). Here, in order to embed into a style such as is shown in FIG. 5, the combined photograph processing section 109c carries out processing such as resizing, rotation and trimming according to the frame.

Once resizing etc. has been carried out, image analysis is next performed (S125). An original image (replacement image) to be combined is analyzed, and image features (for example brightness distribution, color distribution etc.) are acquired. It is also possible to perform analysis using an image for which image processing such as basic image processing has already been completed, or to perform analysis on raw data constituting the original image.

Figure 16A:
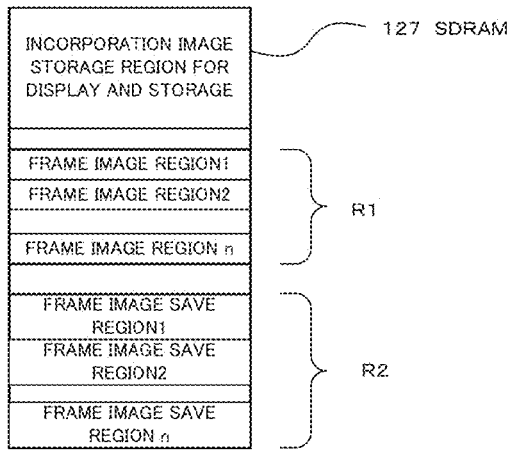
FIG. 16A-FIG. 16C are drawings of the structure of combined photograph manipulation memory, with the camera of one embodiment of the present invention.

Once image analysis has been carried out, frame image storage is carried out next (S127). Here, images that have been subjected to the preprocessing of steps S123 and S125 are stored in the SDRAM 127. FIG. 16A shows incorporation image storage regions for display and storage in the SDRAM 127, with the region R1 being a region for number of frames incorporated into the combined photograph, and region R2 being a safe region for number of frames incorporated into the combined photograph. In this step S127, image data for images that have been subjected to preprocessing and the results of image analysis are stored in corresponding regions of the frame image region R1 (in any of frame image region 1-frame image region n).

Once frame image storage has been carried out, or if the result of determination in step S121 was that there were no frames that have not yet been subjected to preprocessing, color change is next carried out (S129). Here, the combined photograph processing section 109c corrects CbCr so that images to be combined become substantially the same color. At this time processing is carried out using data for each frame image region, but the processing does not update data within a frame image region R1 of the SDRAM 127. This is in order to save data later in an MPO format.

Figure 12A:
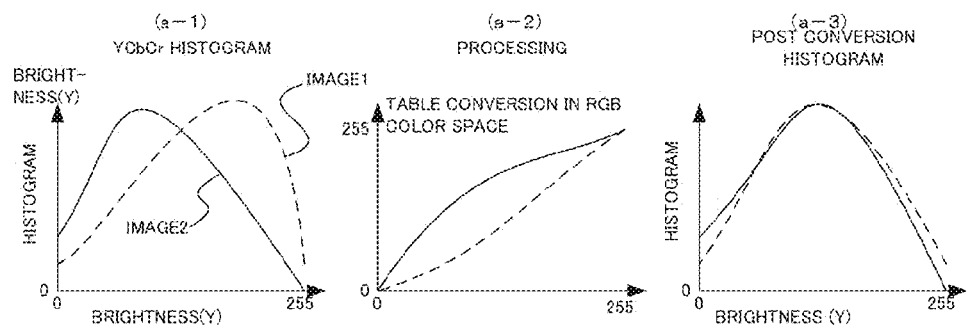
FIG. 12A-FIG. 12C are drawings showing a modified example of image analysis, with the camera of one embodiment of the present invention.
Figure 12B:
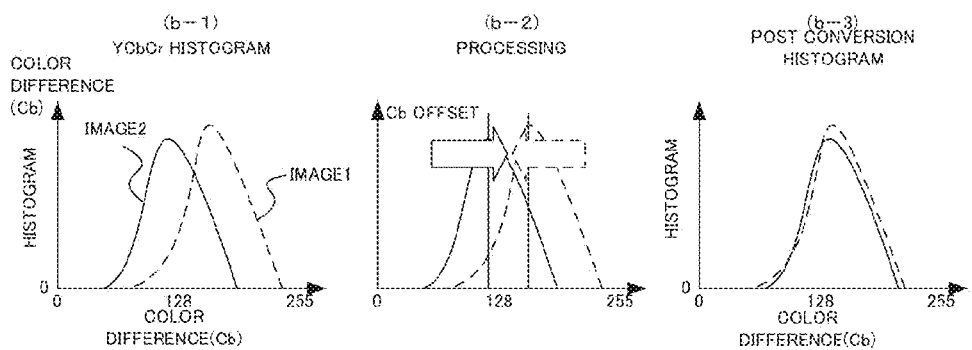
Figure 12C:
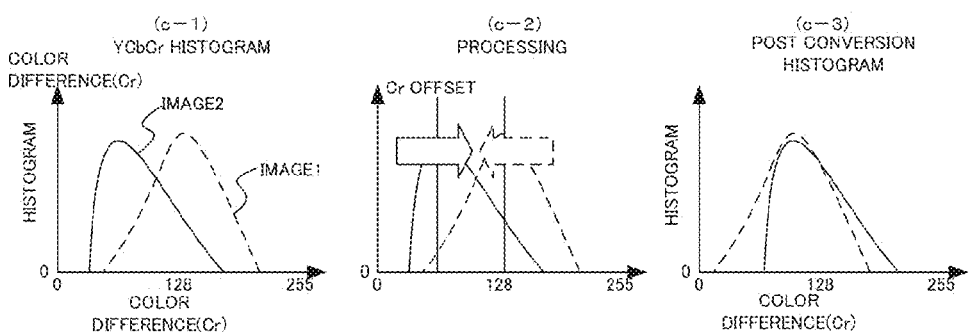

As a color change correction method, for example, CbCr of an image is offset so that a peak of color distribution (distribution on the CbCr plane) for all images to be combined becomes an average value of each peak. This correction method will be described using FIG. 12B and FIG. 12C. The graph (b-1) in FIG. 12B shows color difference (Cb) for image 1 and image 2, while the graph (c-1) in FIG. 12C shows color difference (Cr). If color difference is offset in image 1 and image 2 respectively so that color distribution peak becomes an average value (refer to graph (b-2) in FIG. 12B and graph (c-2) in FIG. 12C), the color difference for both images becomes substantially the same (refer to graph (b-3) in FIG. 12B and graph (c-3) in FIG. 12C).

Once color change has been carried out in step S129, brightness change is next carried out (S131). Here, correction is performed so that images to be combined by the combined photograph processing section 109c become of the same brightness. As a correction method, for example, correction is performed so that average values for each image are substantially matched to an average value for brightness distribution of all images to be combined. At this time if conversion is carried out with brightness gamma (gamma for only a luminance component), color would appear unnatural in the case where brightness was changed significantly. It is therefore possible, for example, to perform gamma correction with RGB color space after RGB conversion.

An example of brightness change will be described using FIG. 12A. The graph (a-1) of FIG. 12A shows brightness of image 1 and image 2. They are both subjected to table conversion in RGB color space (refer to graph (a-2)). As will be understood from (a-1), image 2 has a lot of low brightness components overall, and the low brightness side is raised up as a result of table conversion. After conversion, image 1 and image 1 have substantially the same brightness distribution, as shown in graph (a-3).

Once brightness change has been carried out in step S131, combination is next carried out (S133). Here, the combined photograph processing section 109c combines each images on a background image. Specifically, a combined photograph is created by carrying out combination by embedding images at each position of a style such as is shown in FIG. 5.

If combination has been carried out a special effect is applied next (S135). Here, a special effect such as shading or blurring is added to an image that has been combined. A special effect was added to each image in step 75 of FIG. 8, and in this step a special effect is added to a combined image.

Once a special effect has been added, image storage is next carried out (S137). Here, a combined effect is stored in a combined image storage region for display and storage. Once image storage has been carried out the originating flow is returned to.

In this way, in the flow for combined photograph creation, in the case where preprocessing has not yet been applied, processing such as resizing and image analysis are applied (S123, S125), this preprocessed image data is stored in a frame image region R1 of the SDRAM 127 (S127), and after color change and brightness change have been carried out for images that have been preprocessed (S129, S131), images for a combined photograph are combined (S133), and image storage is carried out (S137). Image data before carrying out preprocessing, color change and brightness change is stored in the frame image region R1, which means that it is possible to read out image data at the time of preprocessing when replacing with a replacement image after combined photograph creation, and it is possible to carry out appropriate color change and brightness change.

Also, in the flow for combined photograph creation, image quality adjustment is carried out so that image quality of each image of a combined photograph is the same (refer to S128). As a result, image quality of each image of a combined photograph is made the same, giving a natural impression. With the combined photograph creation shown in FIG. 11, there was only basic flow, and color bleeding countermeasures for the background image at the time of editing a combined photograph are not applied. The flow for combined photograph creation in which color bleeding of the background image has been prevented will be described later using FIG. 20.

Figure 13:
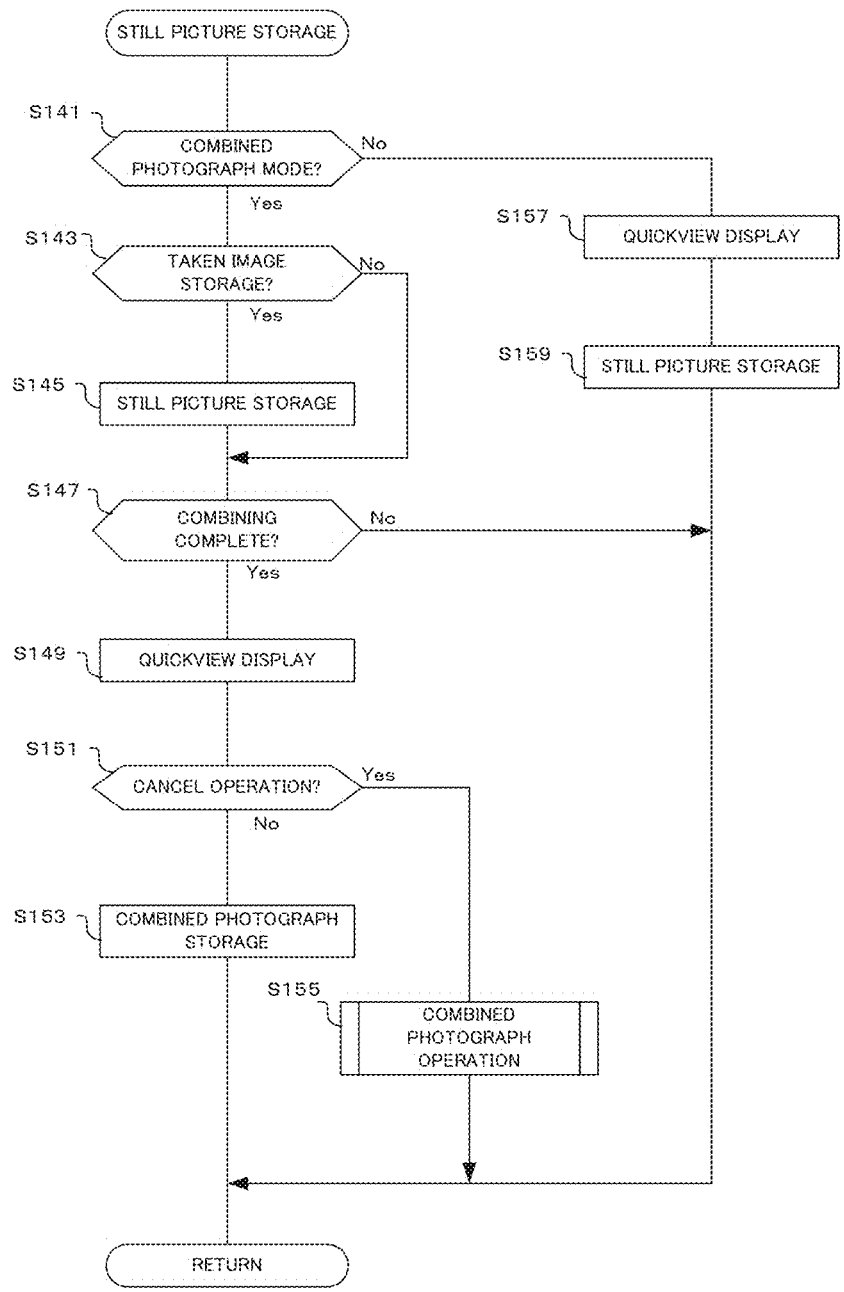
FIG. 13 is a flowchart showing operation of still image storage for the camera of one embodiment of the present invention.

Next, detailed operation of the still picture storage in step S43 (FIG. 7) will be described using the flowchart shown in FIG. 13. This still picture storage performs processing in order to shoot an image using the previously described mechanical shutter 101 (S39), subsequently execute image processing (S43), and then store the image data that has been subjected to image processing in the storage medium 131.

If the flow for still pictures storage is entered, it is first determined whether or not it is combined photograph mode (S141). If the result of this determination is that it is not combined photograph mode, it is normal mode, and Quickview Display is carried out (S157). Here, images stored in the storage medium 131 are temporarily displayed for a specified time on the display panel 135. In this way it is possible for the user to confirm taken images.

Once Quickview Display has been carried out, still picture storage is next carried out (S159). Besides a combined photograph, images that have been subjected to image processing are subjected to JPEG compression and stored in the storage medium 131. However, this is not limited and it is also possible to store in an uncompressed format (for example TIFF etc.), or to use another compression format. It is also possible to store RAW images.

If the result of determination in step S141 and is that it is combined photograph mode, it is determined whether or not to perform taken image storage (S143). With combined photograph mode, even in a case of embedding each image in a style such as is shown in FIG. 5, but where combined photograph mode has been set, images that are not embedded within the style can also be stored. In this step, it is determined whether or not the user has turned on a setting for whether or not to store each frame of the combined photograph, in the camera setting of step S9 in FIG. 6.

If the result of determination in step S143 is taken image storage, still picture storage is carried out (S145). Here, similarly to step S159, a picture is taken as a single taken image, and not a combined photograph, subjected to compression etc. using JPEG or the like, and stored in the storage medium 131.

Once still picture storage has been carried out in step S145, or if the result of determination in step S143 was not taken image storage, it is next determined whether or not combining is complete (S147). Here, a number of images that satisfies a style that has been set in advance are taken, and it is determined whether or not they have been combined. For example, with the combined photograph that was described using FIG. 2 and FIG. 3, four photographs are taken and it is determined whether or not they have been combined. Also, for example, in a case of combining four images, it is also determined that incorporation is complete in a case where two images are taken, and two images are selected from stored images.

If the result of determination in step S147 was incorporation complete, Quickview Display is carried out (S149). Here, after completion of all images as a combined photograph, this combined photograph is subjected to Quickview Display on the display panel 135. During Quickview Display, similarly to the flow for playback, which will be described later, magnified display is also possible.

Once Quickview Display has been carried out, it is next determined whether or not there has been a cancel operation (S151). There may these situations where the user is considering deleting some photographs and replacing them, when looking at the Quickview Display. Therefore, with this embodiment, in the case where Quickview Display is carried out and a cancel operation is performed within a specified time (for example, three seconds), a designated frame is canceled, and shooting can be carried out again. As a cancel operation, it is possible to perform designation on a touch panel, or to cancel using a delete button.

If the result of determination in step S151 is that the cancel operation has been carried out, a combined photograph operation is carried out (S155). Within a subroutine for the combined photograph operation, a cancel operation is executed (refer to S165-S173 in FIG. 14, which will be described later).

On the other hand, if the result of determination in step S151 is that a cancel operation has not been performed, combined photograph storage is carried out (S153). Here, combined image data for a completed combined photograph is stored in the storage medium 131.

If combined photograph storage was carried out in step S153, or if a combined photograph operation was carried out in step S155, or if the result of determination in step S147 was not incorporation complete, or if still picture storage was carried out in step S159, the originating processing flow is returned to.

In this way, in the still picture storage flow, combined photograph storage is not carried out until a number of images determined by the style have been assembled (S147→No), and storage of a combined photograph is carried out once the number of images have been assembled (S153). Also, even after completion of a combined photograph it is possible to cancel an image of the combined photograph that has been designated by carrying out a cancel operation (S151).

Figure 14:
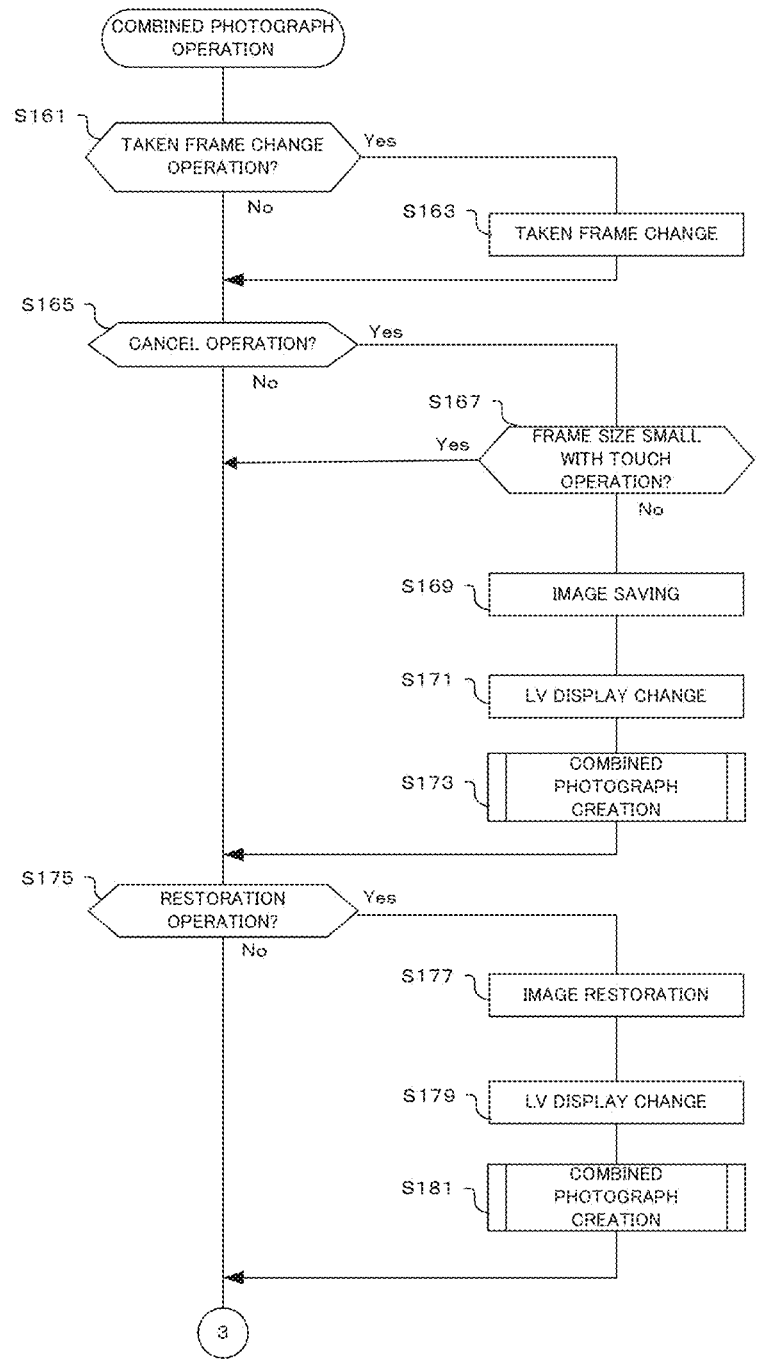
FIG. 14 is a flowchart showing operation of combined photograph manipulation of the camera of one embodiment of the present invention.

Next, detailed operation of the combined photograph operation of step S23 (FIG. 6) and step S155 (FIG. 13) will be described using the flowcharts shown in FIG. 14 and FIG. 15. As described previously, this combined photograph operation is executed when various operations are carried out in order to carry out editing of the combined photograph.

If the flow for combined photograph operation is entered, it is first determined whether or not a taken frame update operation has been carried out (S161), and if the result of this determination is that a taken frame update operation has been performed update of a taken frame is carried out (S163). As was described for the display panels 135f, 135g of FIG. 3, which frame a taken image is embedded within in a combined photograph style can be changed as appropriate. In the case where an operation to update a frame that will be taken has been performed by operation of a cross-shaped key or okay button or a touch panel operation etc., a frame to be taken is updated. At this time, in order to make known which frame is being taken, it is possible to display a border on the frame, display an icon, display frames other than the taken frame darkly, or reduce the chroma of frames other than the taken frame. In the case where a frame is touched during live view display, a release operation (first release and second release, or first release only) is executed. In the case where live view display is being carried out with the plurality of frames, a frame to be taken is selected using the release button.

If update of a taken frame has been carried out in step S163, or if the result of determination in step S161 was that an update operation for a taken frame was not carried out, it is next determined whether or not a cancel operation was performed (S165). As was described for the flow for still picture storage, there are situations where some images making up a completed combined photograph are deleted, or it is desired to replace an image. With this embodiment, therefore, a frame that has been taken is canceled in cases such as when a taken frame is selected using the cross-shaped key, and the delete button is pressed, or a taken frame is dropped onto a trash bin icon on the touch panel. In this step S165 it is determined whether or not either of these operations has been performed.

If the result of determination in step S165 is that a cancel operation has been performed, it is next determined whether frame size of a touch operation is small (S167). In the case where a cancel operation has been carried out by touch operation, it is determined whether or not the size (horizontal and vertical size, or area) of a frame that should be canceled is small (for example, having an area of 1 cm$^2$ or less). This is because if the frame size is small it may result in an erroneous operation.

If the result of determination in step S167 is that the size of a frame that has been subjected to a touch operation is larger than a specified value, image saving (S169) and update of live view display are carried out (S171). Even in the case where an image has been deleted as a result of a cancel operation, there may be cases where it is desired to restore that image. Therefore, in order to be able to carry out restoration of the image (specifically in order to undo a cancel operation), a taken image that has been designated for deletion (image of a frame of the combined photograph) is saved in a separate region within temporary memory, and live view display is updated with that frame appearing in an untaken state. This image saving will be described later using FIG. 16B and FIG. 16C.

If live view display has been carried out combined photograph creation is carried out (S173). The subroutine for this combined photograph creation will be described using FIG. 11. Since an image that has been designated by a cancel operation has been deleted, in this step the combined photograph is created again using remaining images.

If combined photograph creation has been carried out in step S173, or if the result of determination in step S167 was that the frame size with a touch operation was small, or if the result of determination in step S165 was that a cancel operation was not performed, it is next determined whether or not there has been a restoration operation (S175). A restoration operation is carried out in accordance with operation of the operation section 123 or the touch panel 123a, in cases such as when a frame it is desired to restore is selected using the cross-shaped key and a cancel button is operated, or when a trash bin icon is dragged and dropped to a frame it is desired to restore using a touch operation.

If the result of determination in step S175 is that there was a restoration operation, then next an image is restored (S177), and update of live view display is carried out (S179). Here, a saved image is returned to the original position, and live view display is updated with the appearance that that frame has been taken.

If update of live view display has been carried out, combined photograph creation is carried out (S181). The subroutine for this combined photograph creation will be described using FIG. 11. Since an image that was designated by the restoration operation has been restored, in this step the combined photograph is created again also including the restored image.

Figure 15:
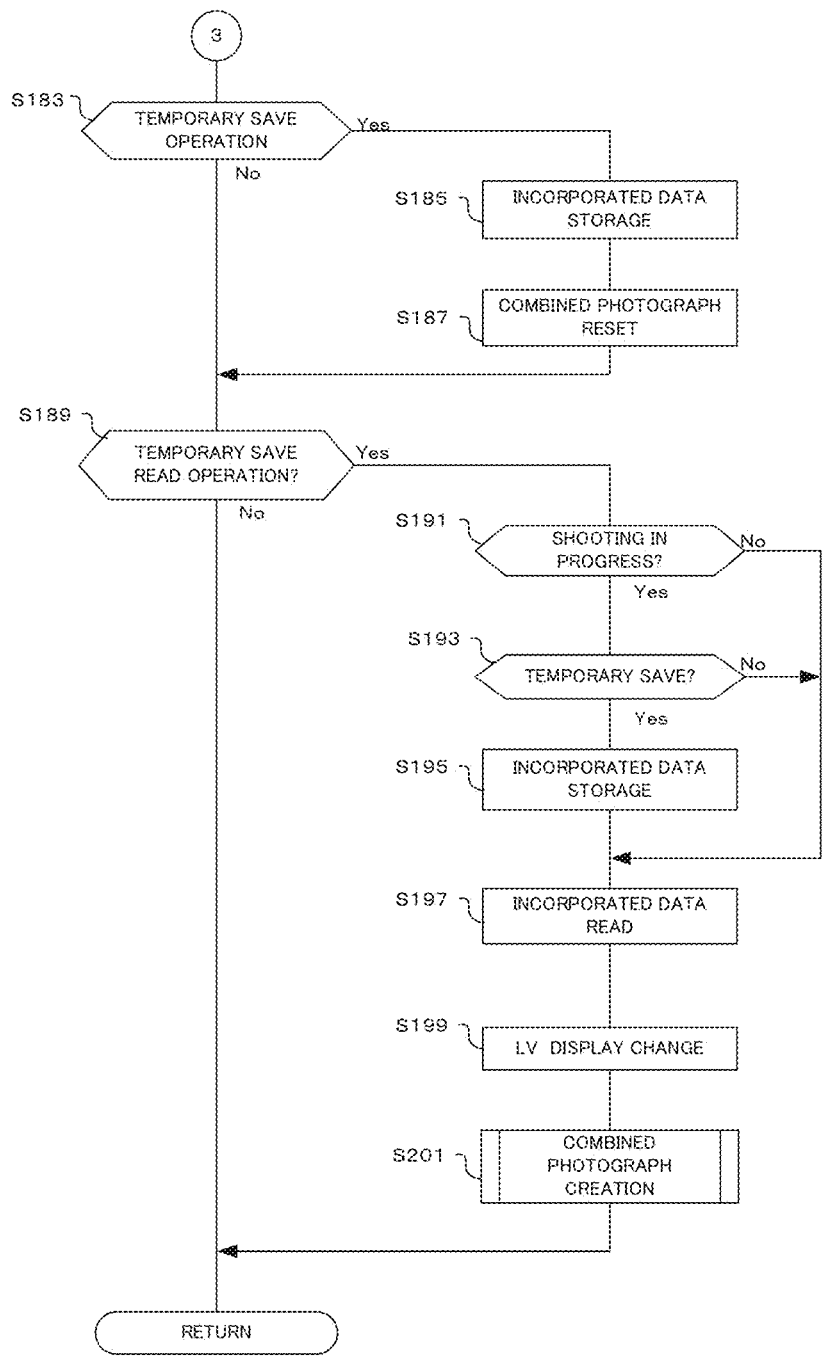
FIG. 15 is a flowchart showing operation of combined photograph manipulation of the camera of one embodiment of the present invention.

If a combined photograph creation has been carried out in step S181, or if the result of determination in step S175 was that a restoration operation was not performed, it is next determined whether or not there has been a temporary storage operation (S183 in FIG. 15). In the case where there have been a plurality of exposures in a short time and creation of a combined photograph is performed, shooting can be carried out continuously. However, in the case of creating a combined photograph using images that were taken at time intervals such as in the morning, in the daytime and at nighttime, it is convenient to be able to temporarily save images during creation of the combined photograph. With this embodiment, therefore it is possible to temporarily save images that make up the combined photograph. As a restoration operation, operations such as selecting a temporary save menu and selecting an icon are carried out using a menu screen or touch panel operation etc.

If the result of determination in step S183 is that there has been a temporary save operation, incorporated data is stored (S185). Here, the state of a currently combined photograph, specifically what photographs have been taken for which style etc., is stored in the flash memory 125 or the storage medium 131. As incorporated data that is stored, there are at least a style (information relating to a template), taken photograph data, and relational information for the photograph data and the template.

If storage of incorporated data has been carried out, the combined photograph is next reset (S187). After storage, information on the combined photograph that has been taken is reset to give a state that is the same as for the first exposure, namely a state where live view display and the SDRAM 127 have been reset etc.

If the reset of the combined photograph has been carried out in step S187, or if the result of determination in step S183 was that a temporary save operation was not performed, it is next determined whether or not there has been a temporary save read operation (S189). In the case where incorporated data for a combined photograph has been temporarily saved in steps S183 and S185, this operation is the reading out of this temporarily saved incorporated data. As the operation, a temporary save read menu or icon selection operation are carried out on a menu screen or touch panel.

If the result of determination in step S189 is that there has been a temporary save read operation, it is next determined whether or not shooting is in progress (S191). There may be situations where a temporary save read operation is carried out while a combined photograph is being taken. In this case, since it is necessary to temporarily interrupt the combined photograph shooting that is currently in progress, this is handled in steps S191-S195. In this step, it is determined whether or not combined photograph shooting mode has been set, and at least one image has been taken for the template.

If the result of determination in step S191 is that shooting of a combined photograph is in progress, whether or not to perform a temporary save is confirmed (S193). In this case, the confirmation screen for whether or not to temporarily save this current state of the shooting progress is displayed on the display panel 135, as a query to the user. If the result of this determination is to perform temporary save, storage of the incorporated data is carried out (S195). Here, the same incorporated data as in step S185 is stored in order to temporarily save the current state.

If incorporated data storage has been carried out in step S195, or if the result of determination in step S193 was not to perform temporary save, or if the result of determination in step S191 was that shooting was not in progress, next the incorporated data is read out (S197), live view display is performed (S199), and combined photograph creation is carried out (S201). Here, incorporated data that was temporarily saved in step S185 is read out, update to live view display similar to that in step S171 and step S179 is carried out, and creation of a combined photograph similar to that in step S173 and step S181 is carried out.

If creation of a combined photograph has been carried out in step S201, or if the result of determination in step S189 was that a temporary data readout operation was not carried out, operation of the combined photograph operation is completed and the originating flow is returned to.

In this way, in the flow for combined photograph operation, it is possible to update a frame to be taken among frames of a style (S163), and it is possible to delete and restore a frame (S169, S177). Further, even during combined photograph shooting, it is possible to temporarily save data, and it is possible to readout this temporarily saved data, and continue with combined photograph shooting.

Next, the image saving (S169) and image restoration (S177) that were described in the flow for the combined photograph operation will be described using FIG. 16B.

Figure 16B:
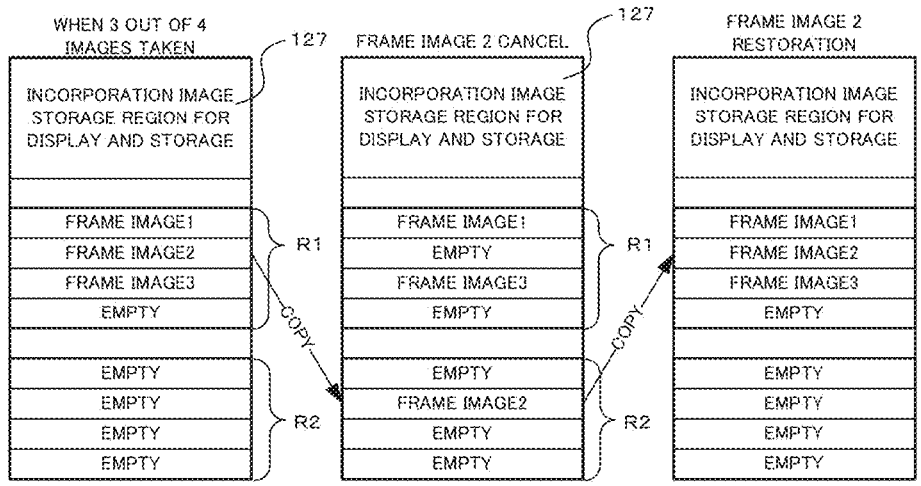

FIG. 16B shows an incorporation image storage region for display and storage, of the SDRAM 127. The left column of FIG. 16B shows a state where three pictures, from within a combined photograph made up of four pictures, have been taken. Specifically, data for frame image 1-frame image 3 is stored within the frame image region R1.

In a state where three pictures have been taken in FIG. 16B, if a cancel operation is performed for frame image 2 (Yes at step S165 in FIG. 14), the data for frame image 2 of the frame image region R1 is copied to frame image 2 of the saved image region R2, and data in the frame image 2 position of the frame image region R1 is deleted (refer to the middle column in FIG. 16B).

Next, if a restoration operation is performed for frame image 2 (yes at step S175 in FIG. 14) data for frame image 2 of the saved image region R2 is copied to the position for frame image 2 in the frame image region R1. The data at the position for frame image 2 in the saved image region R2 is then deleted (refer to the right column of FIG. 16B).

In this way, with this embodiment, a frame image region R1 for storing data for frame images, and the saved image region R2 for saving of data, are provided. Therefore, if there is a cancel operation data is stored in the saved image region R2, and if there is a restoration operation the saved data is copied to the frame image region R1. As a result, it is possible to easily carry out restoration even if an image has been temporarily deleted.

Figure 16C:
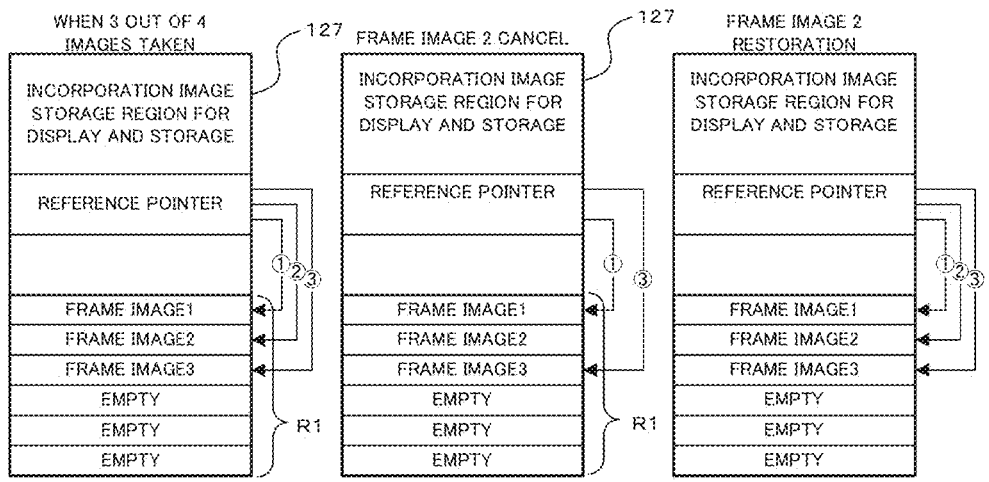

With this embodiment, data is copied at the time of a cancel operation and the restoration operation. This is not limiting, however, and it can also be handled using pointers. FIG. 16C shows an example of handling with pointers.

With the example shown in FIG. 16C, a reference pointer region R3 for storing reference pointers and a frame image region R1 are provided in the combined image storage region for display and storage of the SDRAM 127. First, at the time point where three out of four images have been taken, addresses corresponding to frame image 1-frame image 3, as valid images, are stored in the reference pointer region R3 (refer to the left column in FIG. 16C).

If a cancel operation has been carried out for frame image 2, frame image 2 remains stored in the frame image region R1, but the address for frame image 2 is deleted from the reference pointer region R3 (refer to the middle column of FIG. 16C).

Then, if a restoration operation is carried out for frame image 2, the frame image 2 remains stored in the frame image region R1, and the address for frame image 2 is restored to the reference pointer region (refer to the right column in FIG. 16C).

Figure 17:
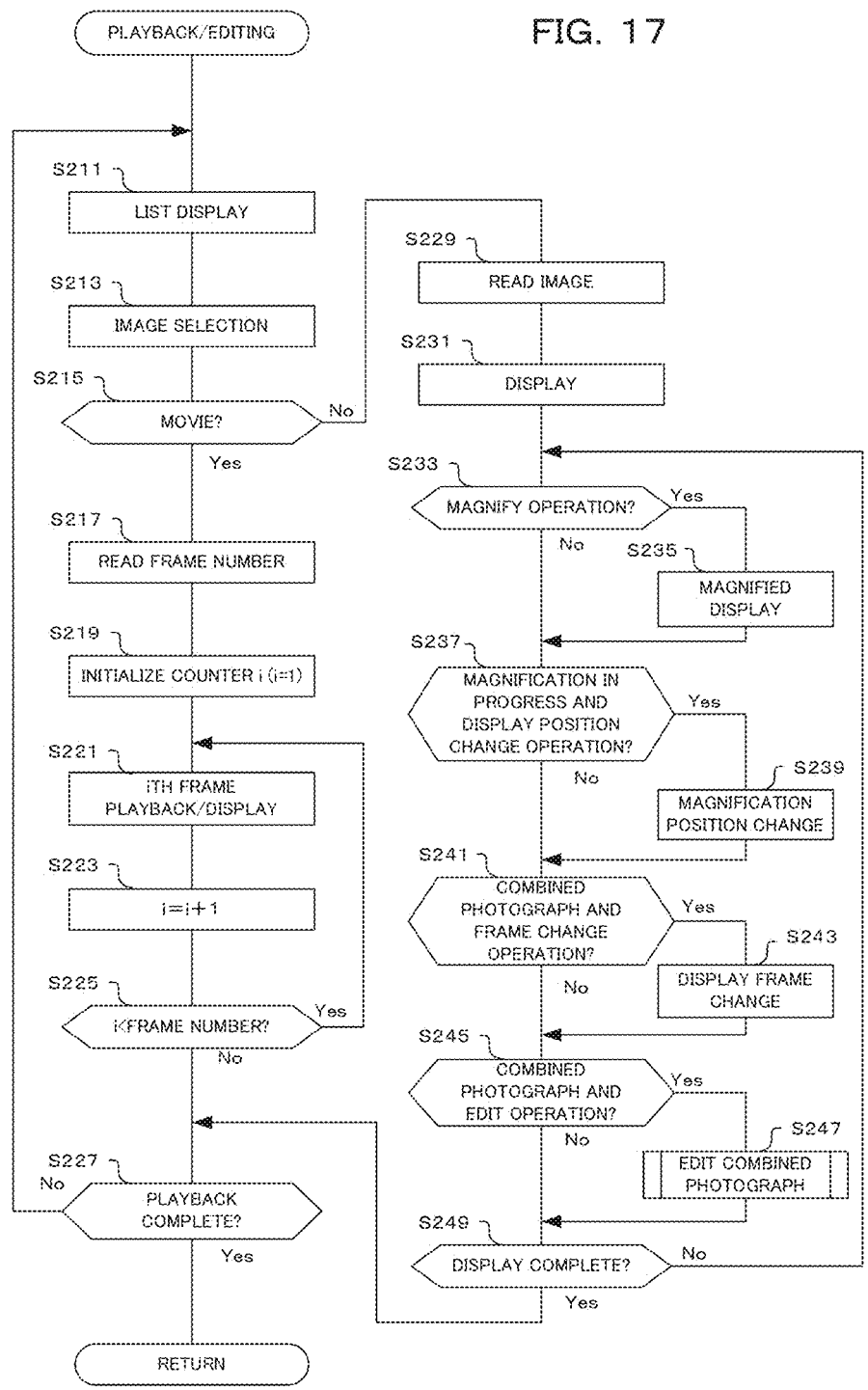
FIG. 17 is a flowchart showing playback and editing operations of the camera of one embodiment of the present invention.

Next, detailed operation of the Playback and editing in step S5 (FIG. 6) will be described using the flowchart shown in FIG. 17. As previously mentioned, this playback and editing is executed when image data that has already been taken is read out from the storage medium 131, and played back.

If the flow for playback and editing is entered, first of all list display is carried out (S211), and image selection is carried out (S213). Here, thumbnails for image files that are stored in the storage medium 131 are subjected to list display. The user then selects images from within the list display.

Once image selection has been carried out, it is next determined whether or not the selected image is a movie (S215). Since still pictures or movies are stored as images, determination is performed based on the format of the image.

If the result of determination in step S215 is that the selected image is a movie, a number of frames is read out (S217). Since a number of frames is stored in the movie file, this information is read out. A counter i is then initialized to 1 (S219). This counter i counts the number of frames.

Next, an ith frame is played back/displayed (S221), 1 is added to counter i (S223), and it is determined whether or not the counter i is smaller than the number of frames (S225). Here image data for the movie is read out sequentially from the first frame, and displayed on the display panel 135. Movie playback is carried out until the counter i reaches the number of frames that was read out in step S217. After that processing advances to step S227.

If the result of determination in step S215 was that the image that was selected in step S213 is a still picture, the image is read out (S229), and displayed (S231). Here, image data for a still picture that has been stored in the storage medium 131 is read out, expansion processing is performed, and the image is displayed on the display panel 135.

If display has been carried out, it is next is determined whether or not a magnification operation has been carried out (S233), and if the result of this determination is that a magnification operation has been performed magnified display is carried out (S235). During still picture display, for example, magnified display is carried out as a result of operation of a magnify button. At this time, in the case of the combined photograph, each frame is displayed magnified, or one particular frame is displayed magnified.

If magnified display is carried out in step S235, or if the result of determination in step S233 was that a magnify operation was not performed, it is next determined whether or not magnification was in progress and a display position change operation was carried out (S237), and if the result of this determination is that the change operation was carried out magnification position change is performed (S239). In the case where magnified display is in progress and a display position change operation, for example, operation of the cross-shaped key, is carried out, a portion within the image that is to be subjected to magnified display is changed. In the case of a combined photograph, this is limited to being able to change only the display position within a frame that is being magnified. In a case where there is no restriction, the same display as for a normal image is carried out.

If magnification position change has been carried out in step S239, or if the result of determination in step S237 was that a display position change operation was not performed while magnification was in progress, it is next determined whether or not it is a combined photograph and a display frame change operation has been performed (S241), and if a change operation has been performed a display frame is changed (S243). In the case of a combined photograph, if magnified display is in progress and there is a display frame change operation, for example, operation of a function button (Fn button), the frame to be subjected to magnified display is switched. At this time, a magnification position is stored for each frame, and in the case where there is an instruction to display the frame currently being displayed again, the same position is subjected to magnified display.

If display frame change has been carried out in step S243, or if the result of determination in step S241 was that there was no display frame change operation for combined photographs, it is next determined whether or not it is a combined photograph and there has been an editing operation (S245), and if the result of this determination is that there has been an edit operation, combined photograph editing is carried out (S247). In the case of a combined photograph, by selecting combined photograph editing from a menu screen, or selecting an editing icon with a touch operation, it is possible to edit a frame of a combined photograph that is currently being played back. Detailed operation of this combined photograph editing will be described later using FIG. 18.

Once combined photograph editing has been carried out in step S247, or if the result of determination in step S245 was that it was not a combined photograph and an editing operation was not performed, it is next determined whether or not display is terminated (S249). Display is terminated if a terminate display button is operated or if a terminate display icon etc. is subjected to a touch operation. If the result of determination in step this step S249 is not terminate display, step S233 is returned to and display continues. On the other hand, in the case of display termination processing advances to step S227.

If the result of decision in step S249 is not display termination, or if the result of determination in step S225 was that counter i of the movie had exceeded the number of frames, it is next determined whether or not to terminate playback (S227). If the playback button is operated once more, playback is terminated. If the result of this determination in this step is not playback termination, step S211 is returned to, and playback mode continues. On the other hand, if the result of determination is playback termination, this playback and editing flow is terminated and the originating flow is returned to.

In this way, in the playback and editing flow, operations such as movie playback, magnified display of a still picture, and editing of a combined photograph etc. are executed. With this embodiment, only combined photograph editing has been carried out, but besides this it is also possible to edit movies.

Figure 18:
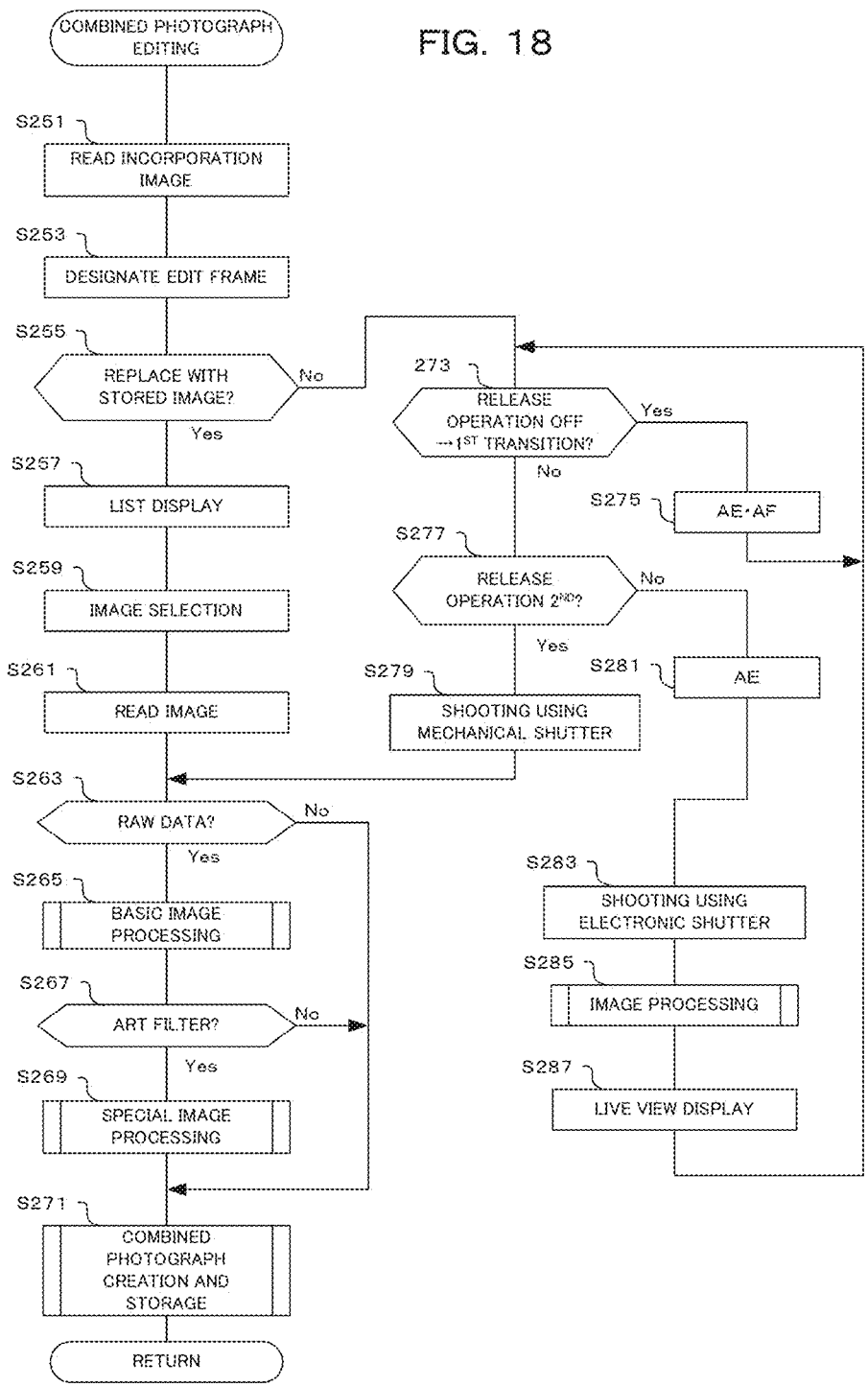
FIG. 18 is a flowchart showing operation of combined photograph editing of the camera of one embodiment of the present invention.

Next, detailed operation of the combined photograph editing of step S247 (FIG. 17) will be described using the flowchart shown in FIG. 18. This combined photograph editing, as was described previously, is executed when data for a completed combined photographic image is read out from the storage medium 131, and an image within the combined photograph is to be replaced with another stored image or a newly taken image.

If the flow for combined photograph editing is entered, first of all readout of incorporation images is carried out (S251). Incorporation images are read out, and a main image and subsidiary images are stored in respective storage regions of the SDRAM 127. Here, the main image is image data of the combined photograph that has been combined, and the subsidiary images are image data that has been subjected to preprocessing (refer to S123 and S125 in FIG. 11). The subsidiary images are stored so as to correspond to each frame in the frame image region shown in FIG. 16A-FIG. 16C.

Once readout of the incorporation image has been carried out, and edit frame is designated (S253). Here, the user designates which, among the plurality of frames that make up the combined photograph, is to be replaced with another image.

Once an edit frame has been designated, it is next determined whether or not to replace with a stored image (S255). As was described previously, at the time of editing it is possible to select an image that has already been stored or an image that has been newly taken. In the case of selecting an image that has already been stored, a table of already stored images is displayed and an image is selected from among the displayed images. On the other hand, in the case of taking a new image, there is a transition to a shooting standby state, and an image is acquired by executing live view display for shooting, and a shooting sequence. Whether to replace with a stored image or to replace with a taken image is selected using a menu screen or icon display.

If the result of determination in step S255 is to replace with a stored image, list display is carried out (S257), and image selection performed (S259). Here, similarly to step S211 and S213 (FIG. 17), thumbnails for image files that are stored in the storage medium 131 are subjected to list display. The user selects an image for replacement from within the list display by operating the cross-shaped key and the okay button etc.

Once image selection has been carried out, image readout is carried out next (S261). Here, image data that was selected in step S259 is read out from the storage medium 131.

If the result of determination in step S255 is that the image for replacement is not a stored image, specifically if an image for replacement is a newly taken image, it is next detected if a release operation has transitioned from off to 1st (S273). Here it is detected whether or not the release button has been pressed down half way. There is a transfer to the shooting preparation state as a result of pressing the release button down half way. If the result of determination in step S273 is that there has been a 1st transition of the release operation from off, AE/AF is next carried out (S275). Similarly to step S33 (FIG. 7), the AE operation and AF operation are executed here. Once AE and AF have been carried out, step S273 is returned to.

If the result of determination in step S273 is that there has not been a first transition from release operation off, it is next determined whether or not it is release operation 2nd (S277). Here it is detected whether or not the release button has been pressed down fully. If the result of this determination is that there has not been a release operation second, AE is carried out (S281), shooting is performed using the electronic shutter (S283), image processing is carried out (S285), and live view display is carried out (S287). Operation in steps S281-S287 is the same as was described previously for steps S51-S57 in FIG. 7, and so detailed description will be omitted. Once live view display has been carried out, processing returns to step S273.

If the result of determination in step S277 is that there is a release operation 2nd, next shooting is carried out using the mechanical shutter 101 (S279). Specifically, it is possible for the user to acquire an image that is to replace a frame of the combined photograph by looking at the live view display and pressing the release button down fully. If exposure is finished in the shooting using the mechanical shutter 101, RAW data is acquired.

Once image data has been read out in step S261, or if exposure using the mechanical shutter 101 in step S279 is finished, it is next determined whether the data format of the image is raw data (S263). The image data acquired in step S279 is RAW, but the image data that has been read from the storage medium 131 includes various formats, such as RAW and JPEG. In the case of RAW data, the basic image processing and special image processing of steps S265-S269 are carried out. In the case of JPEG data image processing has already been performed, and so these image processing steps are skipped.

If the result of determination in step S263 is that it was RAW data, basic image processing is carried out next (S263). This basic image processing is the flow shown in FIG. 9, and so detailed description will be omitted. Once basic image processing has been carried out, it is determined whether or not art filter has been set (S267), and if the result of this determination is that art filter has been set special image processing is carried out (S269). This special image processing is the flow shown in FIG. 10, and so detailed description will be omitted.

If special image processing has been carried out in step S269, or if the result of determination in step S263 was that it was not raw data, or if the result of determination in step S267 was that art filter has not been set, combined photograph creation and storage is carried out next (S271). Since image data for a stored image that has been designated as a replacement image is read out in step S261, or image data for a taken image that has been newly taken as a replacement image is acquired in step S279, in this step a combined photograph is created by replacing an image of one frame of the combined photograph with the replacement image. Detailed operation of this combined photograph creation and will be described using FIG. 19.

In this way, with the flow for combined photograph editing, an image for replacement within the combined photograph is selected from among stored images (S257-S261), or is acquired by new shooting (S279). Then, a new combined photograph is created using the combined photograph on the replacement image (S271).

Figure 19:
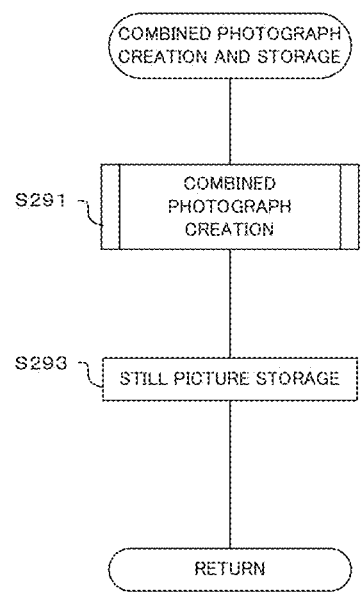
FIG. 19 is a flowchart showing operation of combined photograph formation and storage of the camera of one embodiment of the present invention.

Next, detailed operation of the combined photograph creation and storage in step S271 will be described using the flowchart shown in FIG. 19. If the flow for this combined photograph creation and storage is entered, combined photograph creation is first carried out (S291). Here, the flow that was described in FIG. 11 is executed. Specifically, after carrying out preprocessing for each frame making up the combined photograph, adjustment is performed for each frame by carrying out color change and brightness change etc., so that there is no incongruity. Also, image quality adjustment is carried out so that differences in image quality due to differences in compression ratio etc. are not noticeable. Once the color, brightness and image quality of each frame has been adjusted, a combined photograph is created by carrying out combining.

Once combined photograph creation has been carried out, still picture storage is carried out next (S293). Here, data of the combined photograph that was created in step S291 is stored in the storage medium 131.

Next, in the combined photograph creation that was described using FIG. 11, a flow in which color bleeding of the background image is prevented will be described using FIG. 20. In the combined photograph creation flowchart shown in FIG. 20 the steps S123-S131 and steps S133-S137 are the same as in the flowchart shown in FIG. 11, and the only difference is the addition of steps S301-S305. Description will therefore center on the steps S301-S305.

Color change is carried out in step S129, and brightness change is carried out in step S131. Here, as has been described above, in the case where there are replacement images, correction is carried out so as to give the same color and brightness as other images constituting the combined photograph. Once brightness change has been carried out, it is next determined whether or not a background partial image is stored in the MPO file of the combined photograph that is to be edited (S301). The background partial image is a background partial image formed by creating a background border image in step S305 which will be described later (refer to FIG. 22B), for example, when replacing one of a plurality of images constituting the combined photograph, with a replacement image utilizing an image other than an image constituting the combined photograph.

If the result of determination in step S301 is that a background partial image is stored, background partial removal is next carried out (S303). Here, with respect to a frame for replacing an image, a region that is a number of times the block size at the time of image compression, and including a frame and a background border portion, is filled with the original background image.

If background partial removal has been carried out in step S303, or if the result of determination in step S301 is that a background partial image is not stored, border background image cropping is next carried out (S305). Here, when image editing has been carried out to embed a replacement image in a frame of the combined photograph, cropping of the border background image is carried out and the cropped image is compressed, so that color bleed has no adverse effect. Detailed operation of this border background image cropping be described later using FIG. 21.

After border background image cropping has been carried out in step S305, image composition is carried out (S133). In steps S301-S305, a border region of a frame of the combined photograph is cropped, and image compression is carried out. Image composition for the combined photograph is carried out using this cropped border background image, a replacement image, and an image constituting the combined photograph other than this replacement image. Once this image composition has been carried out, then as described previously, a special effect is applied (S135), image storage is carried out (S137), this flow for combined photograph creation is terminated, and the originating flow is returned to.

Next, operation of the border background image cropping of step S305 will be described using FIG. 21. If the flow for border background image cropping is entered, first of all border brightness difference and color difference are calculated (S311). Average brightness difference and color difference (difference in color difference components) for the background of the border of the frame of a combined photograph that is the subject of combination, and of an image, are obtained. For example, if a case where the upper left image P21 in FIG. 22D is replaced with a replacement image is assumed, a difference between average brightness of this replacement image, and average brightness of a background around the image P2 is obtained, and similarly difference in average color difference between the replacement image and the background around the image P 21 are obtained.

If border brightness difference and color difference have been calculated, it is next determined whether the difference is greater than or equal to a threshold (S313). Here, it is determined whether or not a difference value that was calculated in step S311 is greater than or equal to a predetermined specified value. For example, if a brightness difference is greater than or equal to 16 (in the case of 8-bit data) or the color difference is greater than eight (in the case of 8-bit data), the determination is Yes. In the event that the brightness difference or color difference is greater than or equal to the specified value, images constituting the combined photograph are superimposed on the background image, and once image compression has been carried out it is easy for color bleed to arise at the periphery of the images constituting the combined photograph. Image processing is therefore carried out in step S315 and after so as to reduce the effect of this color bleed.

If the result of determination in step S313 is that the differences are greater than or equal to the threshold, a width is next calculated (S315). Here, width of a block is calculated from difference values that were calculated in step S311 (refer to FIG. 22A and FIG. 23A-FIG. 23E). In this embodiment, width is varied in accordance with difference of the brightness difference on the color difference, but the width may always be block size (for example 8×8 pixels) at the time of compression.

Once width has been calculated, cropping is next carried out (S317). Here, a strip shaped background image including the combination border between the replacement image and the background is cropped to a width that was calculated in step S315 (refer to FIG. 22(b)). Once the image has been cropped, this cropped image is subjected to image compression at the same format and compression ratio as for the image compression at the time of storing the combined photograph after editing (S319). As a result of this processing, the background becomes of the same image quality as other sections. Once image compression has been carried out, or if the result of determination in step S313 was that the differences were not greater than or equal to the threshold, the originating processing flow is returned to, and combination is carried out in step S133 (refer to FIG. 22C). The cropped image may be uncompressed or subjected to lossless compression, instead of the image compression as described above. A compression format that is different to JPEG may also be used at the time of compressing the combined photograph. However, it is preferable to carry out compression with the same compression format and the same compression parameters (parameters for determining image quality such as a quantization table) as for the combined photograph in which the cropped image was edited. By carrying out the same compression as for the edited combined photograph, it is possible to make image quality of the cropped image the same as the image quality of the edited combined photograph, which means that there is no difference in image quality between the cropped image and the edited combined photograph at the time of reediting, and a more naturally appearing reediting result is obtained.

Next, an editing sequence when replacing one image P21 from among the plurality of images constituting the combined photograph with the replacement image P22 will be described using FIG. 22A-FIG. 22D. FIG. 22D shows a combined photograph before editing, in which the image P21 is to be replaced with the replacement image P22 (refer to FIG. 22C).

Figure 22A:
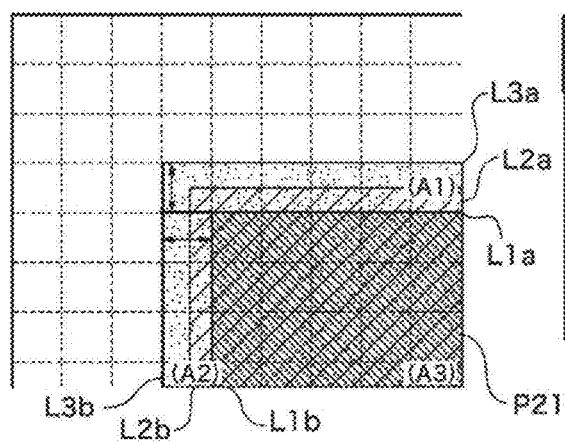
FIG. 22A-FIG. 22D are drawings for describing a background partial removal method of a camera of one embodiment of the present invention.
Figure 22D:
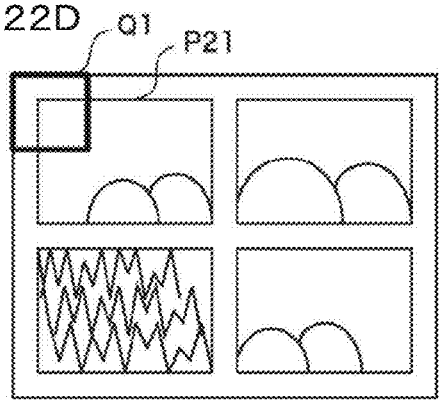
Figure 22B:
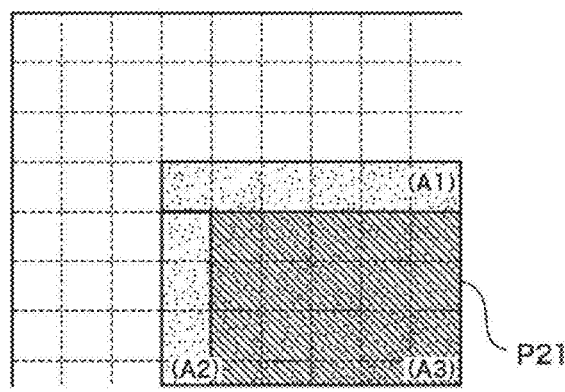
Figure 22C:
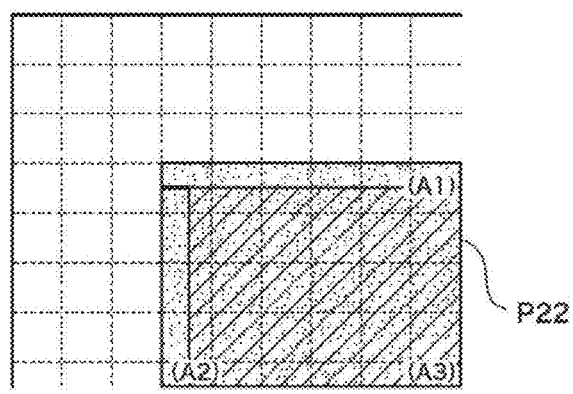

FIG. 22A-FIG. 22C are expanded drawings of a region Q1 that includes the image to be replaced P21, which is the upper left of the combined photograph, and a background image. Also, FIG. 22B shows the first editing procedure, while FIG. 22C shows the second editing procedure. FIG. 22D shows the combined photograph that will be edited. With this embodiment, image compression is carried out in block units made up of 8×8 pixels, and this block is shown by rectangles drawn using dashed lines. The image to be replaced P21 is further to the inside than lines L2a and L2b in FIG. 22A. The combined photograph to be edited shown in FIG. 22D is subjected to degradation in image quality because of high compression, to blur near the boundary. Since this portion (close to a strip-shaped boundary between the rectangle formed by lines L1a and L1b and the rectangle formed by lines L3a and L3b) is blurred, only this portion has a pattern. In other words, the boundary region has a pattern of the height or width of compressed blocks including the boundary.

Figure 24A:
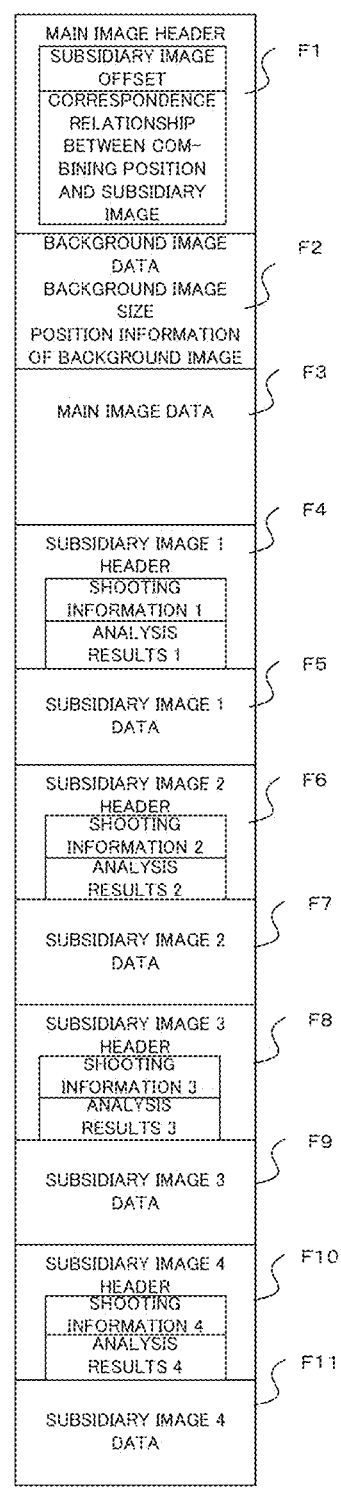
FIG. 24A and FIG. 24B are drawings showing a file structure in a camera of one embodiment of the present invention.

With this embodiment therefore, as shown in FIG. 22B, a portion close to the boundary (a strip shaped boundary portion between a rectangle defined by lines L1a and L1b and a rectangle defined by lines L3a and L3b) is divided into two regions A1 and A2, where boundary portions are respectively overwritten with the pattern of the background image (refer to F2 in FIG. 24A). The pattern of a background image represents background image data that is background image stored in a region separately and at a different region from an image itself (stored in F2 in FIG. 24).

After the boundary portions have been rewritten with the pattern, next, as shown in FIG. 22C, the replacement image P22 is combined. Specifically, the replacement image P22 is replaced at the position (within the frame formed by lines L2a and L2b) of the image to be replaced P21 before editing.

In the case of a combined photograph, color bleed arises around the plurality of images constituting this combined photograph at the time of image compression. As a result of this color bleed, if the average color of images constituting the combined photograph is blue, the color bleed will have a blue tinge, while if the average color of the images is red the color bleed will have a red tinge. Once the combined photograph has been created and image compression has been carried out, this color bleed is formed into the background of the image. After combined photograph preparation, at the time of imaging operations to replace one from among the plurality of images constituting in the combined photograph, color bleed that was formed at the time of the previous image remains, and coloration of the combined photograph after the editing operation becomes unnatural.

With this embodiment, in order to alleviate this disadvantage, when carrying out an operation to replace some images of a combined photograph, the images are replaced with replacement images after borders of the images have been temporarily overwritten with a specified pattern. As a result, the coloration of the combined photograph after the editing operation does not become unnatural.

Figure 23A:
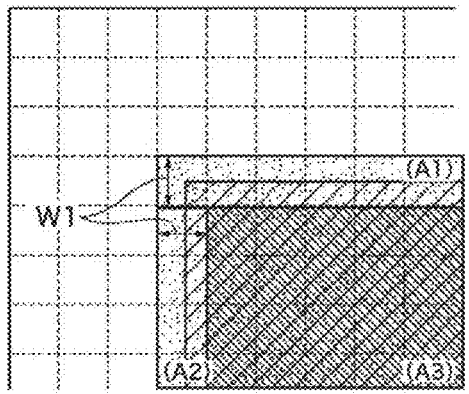
FIG. 23A-FIG. 23E are drawings for describing background partial region change in a camera of one embodiment of the present invention.
Figure 23B:
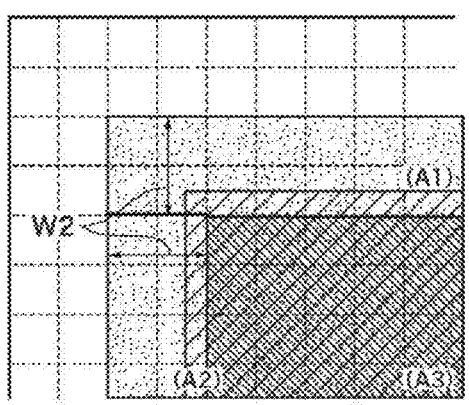
Figure 23C:
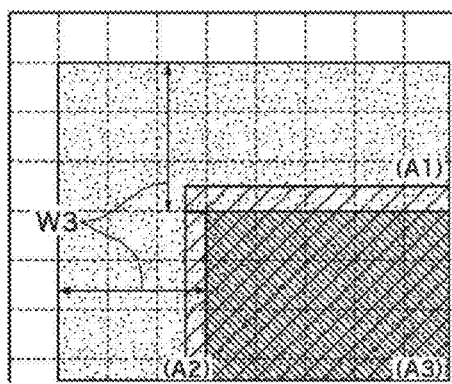

Next, the width and the position for carrying out cropping will be described using FIG. 23. FIG. 23A, similarly to FIG. 22A, shows color bleed at the time of JPEG expansion. At the time of JPEG expansion, since there are cases where filter processing etc. is applied to reduce the block size, there may be cases where a region in which image degradation occurs (regions A1 and A2 in FIG. 22A) may become wider or narrower.

In the case where a brightness difference (color difference) between the background and an image is large, the extent of the background is widened in units of the block size at the time of compression. With the case in FIG. 23A, this expansion is by the width W1, but with the case in FIG. 23B since the brightness difference (color difference) has become large the expansion is to the width W2 (two blocks). Also, with the case in FIG. 23C, since the brightness difference (color difference) has become even larger, expansion is to the width W3 (three blocks).

Figure 23D:
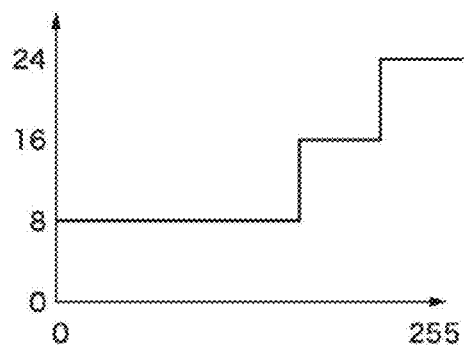
Figure 23E:
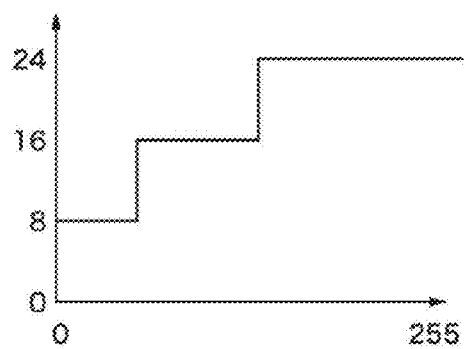

FIG. 23D is a graph showing one example of a relationship between brightness difference and background size, in which the vertical axis shows the width or height of a background that is held, and the horizontal axis shows border average brightness difference. With this example one block is 8×8 pixels, and widening is carried out one block at a time in accordance with brightness difference. FIG. 23E is a graph showing one example of a relationship between color difference and background size, in which the vertical axis shows the width or height of a background that is held, and the horizontal axis shows difference in border average color difference. With this example also, one block is 8×8 pixels, and widening is carried out one block at a time in accordance with difference in color difference. Generally, since color difference is more likely to cause a feeling of strangeness, then if the difference in color difference is large the width is made larger compared to the case of brightness difference.

Figure 24B:
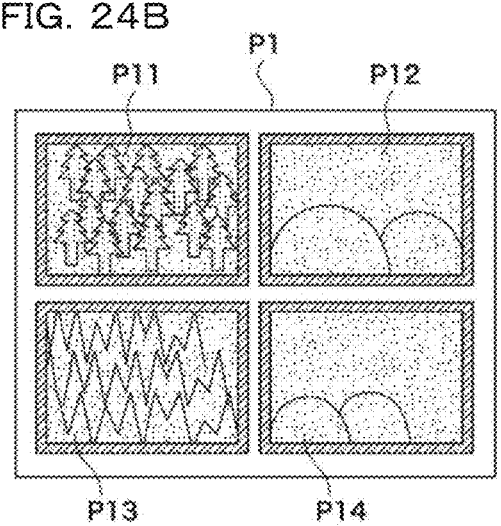

Next, the file structure of this embodiment will be described using FIG. 24A-FIG. 24B. The file structure is shown in FIG. 24A. This file is stored in the SDRAM 127 or the storage medium 131.

A main image header is stored in region F1. A subsidiary image offset representing the address at which the subsidiary image is stored, a correspondence relationship between the combining position and the subsidiary photograph, and style information for the combined photograph are stored in this main image header. Data on the background image, such as background image data, background image size, background image position information etc. are stored in region F2.

Also, main image data is stored in region F3. The combined photograph P1 is an example of a main image. Also, headers for subsidiary images 1, 2, 3 and 4 are stored in regions F4, F6, F8 and F10, while data for the subsidiary images 1, 2, 3 and 4 are stored in regions F5, F7, F9 and F11. Analysis results of step S125 (FIG. 11) and shooting information are stored in the subsidiary image headers.

Main image data that is stored in region F3 is image data of the combined photograph P1, and subsidiary image data that is stored in the regions F5, F7, F9 and F11 is image data for subsidiary images P11, P12, P13 and P14 constituting the combined photograph P1. In this way, the subsidiary images and the combining positions, and data such as analysis results, are stored in the storage section (SDRAM 127, storage medium 131) as a single image file. Also, a minimum background image and coordinates corresponding to the background image are stored in the region F2 of image file.

Figure 25A:
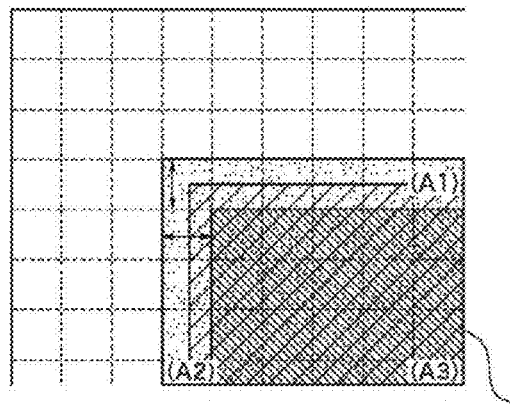
FIG. 25A-FIG. 25D are drawings for describing a modified example of background partial removal of the camera of one embodiment of the present invention.
Figure 25D:
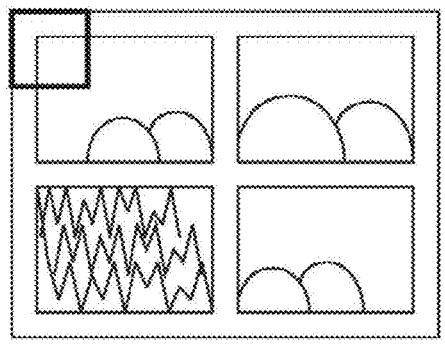
Figure 25B:
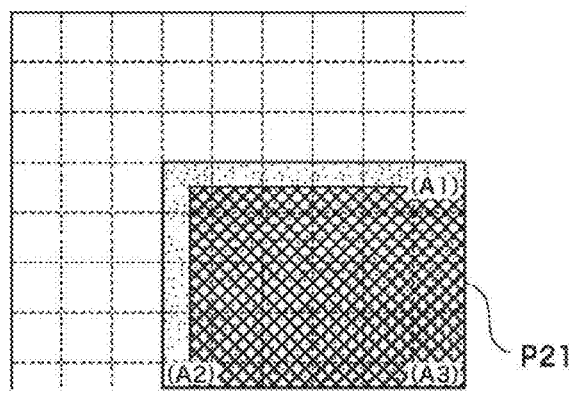
Figure 25C:
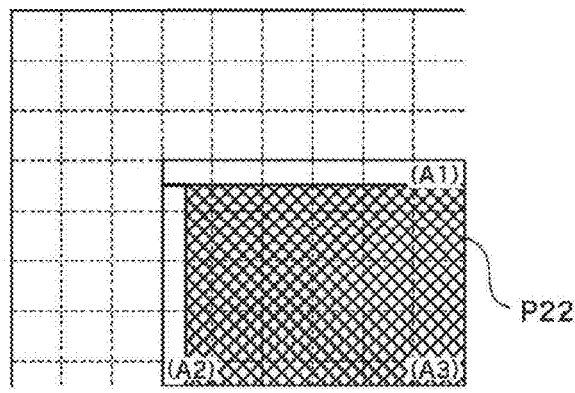

Next, a modified example of the background partial removal will be described using FIG. 25A-FIG. 25D. The background partial removal of the one embodiment that was shown in FIG. 22A-FIG. 22D first has a border portion between images constituting the combined photograph and a background image overwritten with a held pattern, as shown in FIG. 22B, and once this processing has been completed the replacement image is then combined, as shown in FIG. 22C. However, this is not limiting, and as shown in FIG. 25B a replacement image P21 is combined first. After this combining, as shown in FIG. 25C, portions of regions A1 and A2 of the border are overwritten with the held pattern.

Next, a situation where images constituting the combined photograph are arranged diagonally will be described using FIG. 26A-FIG. 26D. Here, FIG. 26B shows a first editing procedure, while FIG. 26C shows a second editing procedure. FIG. 25D shows the combined photograph that will be edited. With the above-described examples, images constituting the combined photograph were arranged horizontally and vertically with respect to the block for compression, and were not arranged diagonally. However, depending on the style of the combined photograph, there may be cases where the images are arranged diagonally, as shown in FIG. 26D.

A region of a background image (background portion image) to be cropped is widened in accordance with brightness difference and differences in color difference between images constituting the combined photographs and images of the background. With the example shown in FIG. 26B, since there is a large brightness difference and difference in color difference, blocks in which color bleed arises affect adjacent blocks, and so cropping is performed by widening the image to be cropped by one block and color bleed prevention processing must be applied. Compared to the case shown in FIG. 26A, the background portion to be cropped is widened (in the drawing, the region where the dot density is lowest).

Figure 26A:
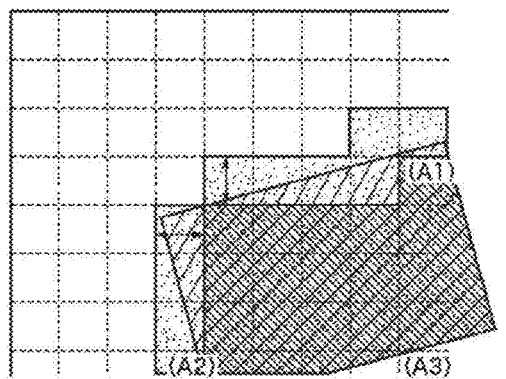
FIG. 26A-FIG. 26D are drawings for describing processing in a case where an image span regions diagonally, in a camera of one embodiment of the present invention.
Figure 26D:
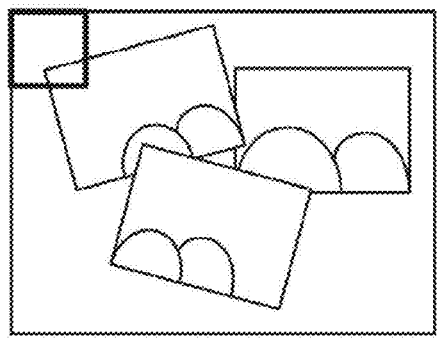
Figure 26B:
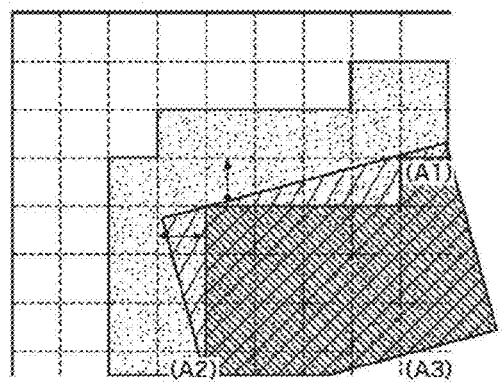
Figure 26C:
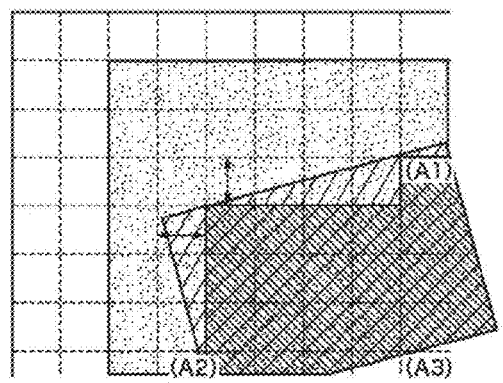

Also, the background portion (background portion image) to be cropped is selected in block units in FIG. 26A and FIG. 26B. However, this is not limiting, and, as shown in FIG. 26C, an elongated rectangular region including the border portion (region where the dot density is lowest) may also be selected.

JPEG compression and MPEG compression in a conventional image editing device is performed by dividing an image into small blocks such as 8×8 pixels, for example, and carrying out compression for respective blocks. If the compression ratio is large, then in general high-frequency components of each block will be gradually lowered, resulting in a color that appears averaged within the blocks. In images such as where a separate image is superimposed on the background image, if high compression is carried out colors of a background of a border portion and a combined image are averaged, and the color in the vicinity of a border of a combined image affects the outside of the border, giving a blurred appearance.

In the case of editing a combined photographic image made by combining a plurality of images, if editing to replace one among the plurality of images with another single image is carried out, there may be cases where combination is performed with the occurrence of color bleed remaining in a border region between the image that has been replaced and the background image. As a result, in a conventional image editing device the image quality of the combined photograph is lowered, giving an unnatural combined photograph. Conversely, with this embodiment, the image quality of the combined photograph is not lowered, resulting in a natural combined photograph.

Figure 20:
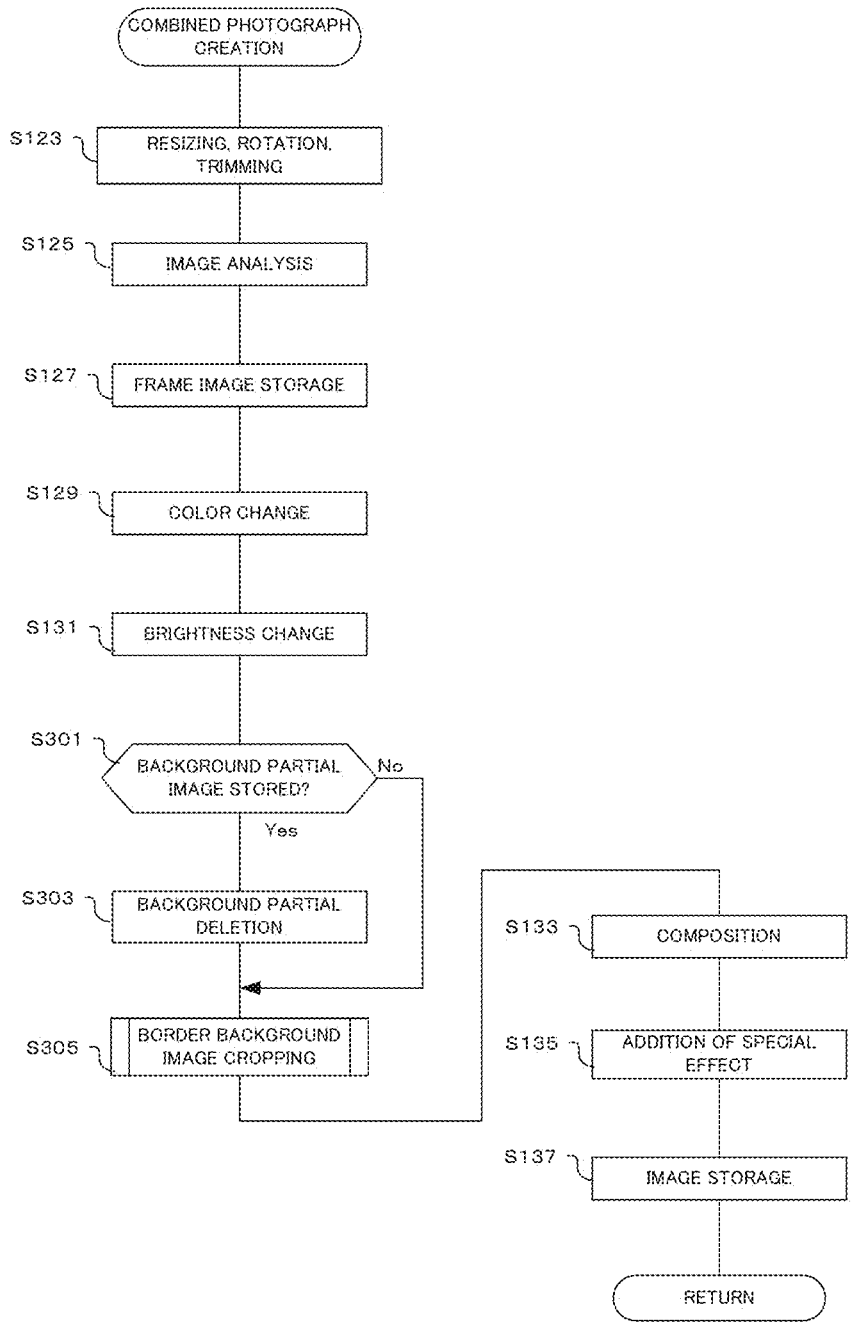
FIG. 20 is a flowchart showing operation of combined photograph creation of the camera of one embodiment of the present invention.

As has been described above, the image editing device of the one embodiment of the present invention combines a plurality of images with a background image in accordance with combining position of a combined photograph to create the combined photograph (refer to S133 in FIG. 20), selects a plurality of blocks including at least the combining position off the combined photograph as a background portion image (S305 in FIG. 20), and stores an image that has been compressed by an image compression section (image compression and expansion section 115) and the selected background portion image as a single image file (S137 in FIG. 20, and FIG. 24). As a result, it is possible to edit a combined photograph that appears natural with high image quality, even if some images constituting the combined photograph are replaced with the replacement image.

The one embodiment of the present invention has been described using an example where the present invention is applied to a camera, but this is not limiting, and it is also possible to apply the present invention to an image editing device for creating a combined photograph using already taken images, and to an image editing device that does not have a photographing function, such as a personal computer.

Further, with the one embodiment of the present invention, a device for taking pictures has been described using a camera, but as a camera it is also possible to use a digital single lens reflex camera or a compact camera, or a camera for movie use such as a video camera, and further to have a camera that is incorporated into a mobile phone, a mobile information terminal (PDA: Personal Digital Assistant), game console etc. In any event, it is possible to adopt the present invention as long as a device is capable of shooting combined photographs.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image editing device, for editing a combined photographic image formed by combining a plurality of images with a predetermined background image, comprising:
   a combined photograph processing section for creating a combined photograph by combining a plurality of images with the background image in accordance with combining position of the combined photograph;
   an image compression section for dividing the combined photograph into a number of blocks of a specified number of pixels, and subjecting an image to lossy compression;
   a background portion image selection section for dividing the background image into the blocks, and selecting a plurality of blocks that include at least the combining position as a background portion image; and
   a storage section for storing an image that has been compressed by the image compression section, and the background portion image that has been selected by the background portion image selection section, as a single image file.

2. The image editing device of claim 1, further comprising:
   an image expansion section for expanding an image that has been subjected to the image compression that is stored in the image file; and
   a background portion combining section for combining the background portion image stored in the image file with the image that has been expanded by the image expansion section, wherein;
   the combined photograph processing section combines a replacement image with an image that was combined by the background portion combining section.

3. The image editing device of claim 1, wherein
   the background portion image selection section changes a number of the blocks to be selected as the background portion image in accordance with brightness component differences between the background image and the border portion of the plurality of images.

4. The image editing device of claim 1, wherein
   the background portion image selection section changes a number of the blocks to be selected as the background portion image in accordance with color difference component differences between the background image and the border portion of the plurality of images.

5. The image editing device of claim 1, wherein
   the image compression section compresses the background portion image using the same compression method as for the combined photograph.

6. An image editing method, for editing a combined photographic image formed by combining a plurality of images with a predetermined background image, comprising:
   a step of creating a combined photograph by combining a plurality of images with the background image in accordance with combining position of the combined photograph;
   a step of dividing the combined photograph into a number of blocks of a specified number of pixels, and subjecting an image to lossy compression;
   a step of dividing the background image into the blocks, and selecting a plurality of blocks that include at least the combining position as a background portion image; and
   a step of storing the compressed image and the selected background portion image as a single image file.

7. A non-transitory storage medium for storing a program to be executed on a computer of an image editing device, for editing a combined photographic image formed by combining a plurality of images with a predetermined background image, the program comprising:
   a step of creating a combined photograph by combining a plurality of images with the background image in accordance with combining position of the combined photograph;
   a step of dividing the combined photograph into a number of blocks of a specified number of pixels, and subjecting an image to lossy compression;
   a step of dividing the background image into the blocks, and selecting a plurality of blocks that include at least the combining position as a background portion image; and
   a step of storing the compressed image and the selected background portion image as a single image file.

* * * * *